(12) United States Patent  (10) Patent No.: US 8,428,423 B2
Ishii (45) Date of Patent: Apr. 23, 2013

(54) REPRODUCING APPARATUS FOR VIDEO DATA

(75) Inventor: Akiyoshi Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/942,432

(22) Filed: Nov. 9, 2010

(65) Prior Publication Data

US 2011/0142410 A1 Jun. 16, 2011

(30) Foreign Application Priority Data

Dec. 11, 2009 (JP) ................................. 2009-281622

(51) Int. Cl.
*H04N 5/77* (2006.01)

(52) U.S. Cl.
USPC ........................................................ 386/224

(58) Field of Classification Search ........................ None
See application file for complete search history.

(56) References Cited

U.S. PATENT DOCUMENTS

| | | | |
|---|---|---|---|
| 2002/0110368 A1* | 8/2002 | Mori et al. ....................... | 386/98 |
| 2009/0021613 A1* | 1/2009 | Ito et al. ........................ | 348/252 |
| 2009/0110376 A1* | 4/2009 | Matoba .......................... | 386/131 |

FOREIGN PATENT DOCUMENTS

JP 2009-076175 A 4/2009

* cited by examiner

*Primary Examiner* — Thai Tran
*Assistant Examiner* — Sunghyoun Park
(74) *Attorney, Agent, or Firm* — Fitzpatrick, Cella, Harper & Scinto

(57) ABSTRACT

A reproducing apparatus arranged to reproduce a moving image signal of a scene from a recording medium, set one of a first reproduction mode for reproducing one scene selected from the moving image signal of a selected one scene and a second reproduction mode for reproducing the moving image signals according to a playlist, convert the moving image signal recorded on the recording medium into a format designated by a transmission destination of the moving image signal, and effect control in response to a conversion instruction such that, in the first reproduction mode, the moving image signal of the one scene is divided on a unit basis of predetermined time related to an upper limit time designated by the transmission destination of the moving image signal and in the second reproduction mode, the moving image signals of the plurality of scenes are combined and the combined moving image signal is divided on the predetermined time basis.

17 Claims, 23 Drawing Sheets

FIG. 3

| STORAGE DESTINATION | REPRODUCTION MODE | CONVERSION SUBJECT | CONVERSION PROCESSING CONTENT | SCENE COMBINATION |
|---|---|---|---|---|
| DVD | FIRST REPRODUCTION MODE | ONE SCENE | CONVERTING SELECTED ONE SCENE | NO |
| | | PLURAL SCENES | CONVERTING ALL SELECTED SCENES | NO |
| | SECOND REPRODUCTION MODE | ALL SCENES | CONVERTING ALL SELECTED SCENES | YES |
| WEB | FIRST REPRODUCTION MODE | ONE SCENE | DIVIDING ALL SELECTED SCENES ON TEN MINUTES BASIS AND CONVERTING DIVIDED SCENES | NO |
| | | PLURAL SCENES | DIVIDING SELECTED ONE SCENE ON TEN MINUTES BASIS AND CONVERTING DIVIDED SCENE | NO |
| | SECOND REPRODUCTION MODE | ALL SCENES | DIVIDING ALL SELECTED SCENES ON TEN MINUTES BASIS AND CONVERTING DIVIDED SCENES | YES |

FIG. 12

| STORAGE DESTINATION | REPRODUCTION STATE | REPRODUCTION MODE | CONVERSION SUBJECT | CONVERSION PROCESSING CONTENT | SCENE COMBINATION |
|---|---|---|---|---|---|
| DVD | INDEX DISPLAY | FIRST REPRODUCTION MODE | ONE SCENE | CONVERTING SELECTED ONE SCENE | NO |
| | | | PLURAL SCENES | CONVERTING ALL SELECTED SCENES | NO |
| | | SECOND REPRODUCTION MODE | ALL SCENES | CONVERTING ALL SELECTED SCENES | YES |
| | TEMPORARY STOP OF REPRODUCTION | FIRST REPRODUCTION MODE | — | CONVERTING FROM TEMPORARY STOP POINT TO END OF SCENE | NO |
| | | SECOND REPRODUCTION MODE | — | CONVERTING FROM TEMPORARY STOP POINT TO END OF LAST SCENE | YES |
| WEB | INDEX DISPLAY | FIRST REPRODUCTION MODE | ONE SCENE | DIVIDING SELECTED ONE SCENE ON TEN MINUTES BASIS AND CONVERTING DIVIDED SCENE | NO |
| | | | PLURAL SCENES | DIVIDING ALL SELECTED SCENES ON TEN MINUTES BASIS AND CONVERTING DIVIDED SCENES | NO |
| | | SECOND REPRODUCTION MODE | ALL SCENES | DIVIDING ALL SELECTED SCENES ON TEN MINUTES BASIS AND CONVERTING DIVIDED SCENES | YES |
| | TEMPORARY STOP OF REPRODUCTION | FIRST REPRODUCTION MODE | — | CONVERTING FROM TEMPORARY STOP POINT TO TEN MINUTES THEREAFTER OR END OF SCENE | NO |
| | | SECOND REPRODUCTION MODE | — | CONVERTING FROM TEMPORARY STOP POINT TO TEN MINUTES THEREAFTER OR END OF LAST SCENE | YES |

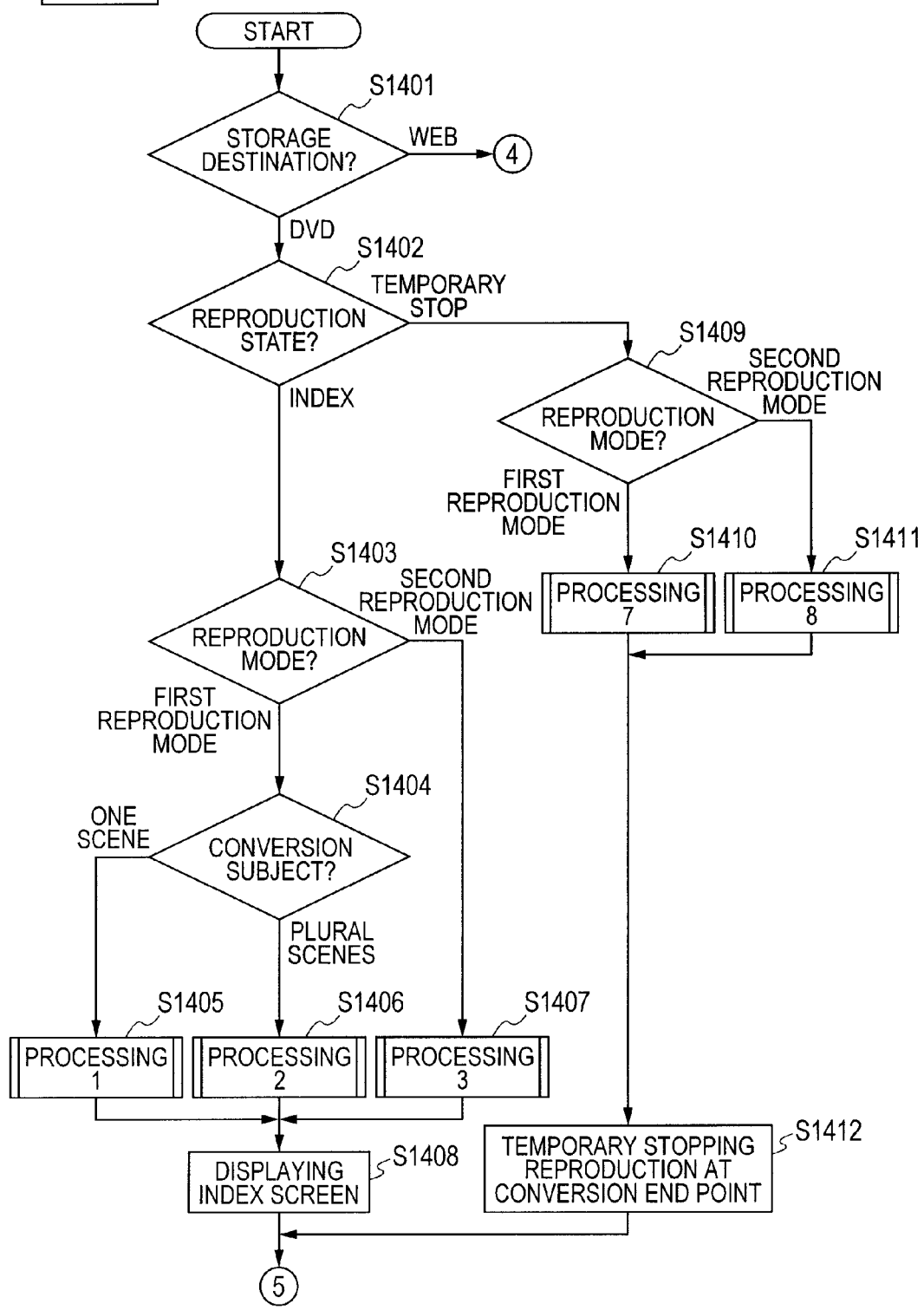

| FIG. 18A |
| FIG. 18B |

REPRODUCING APPARATUS FOR VIDEO DATA

BACKGROUND OF THE INVENTION

1. Field of the Invention

The present invention relates to a reproducing apparatus, and more particularly to a reproducing apparatus for video data.

2. Description of the Related Art

There has conventionally been known a video camera that photographs an object and records a moving image and audio of the object (for example, see Japanese Patent Application Laid-Open No. 2009-076175). In recent years, a moving image posting and browsing service on the Internet has been known, and a video camera having a function of uploading a moving image on a server having the service described above has been known. A user accesses to a specific home page or a site with the use of a personal computer or a portable terminal having a video reproducing function, thereby being capable of browsing the uploaded moving image. It is to be noted that there is, in general, a limitation on a length or a size of an uploadable moving image or a file format depending on the service of the upload destination.

When a format of the moving image or the audio photographed by a video camera is different from the format specified by the service described above, it is necessary to change the moving image or the audio into a format (posting format) designated by the upload destination. For example, a user has to transfer the moving image or the audio photographed by the video camera to the personal computer, convert or edit the moving image or the audio to the posting format with the use of conversion software, and then, upload onto a server on the Internet. The operation described above is very troublesome.

Some of the posting destinations impose a limitation on an upper limit time on one file.

SUMMARY OF THE INVENTION

It is an aspect of the invention to solve the problem described above, and provide an apparatus capable of easily converting a format of a moving image according to a storage destination.

In order to achieve the above-described object, according to an aspect of the present invention, a reproducing apparatus comprises a reproduction unit configured to reproduce a moving image signal from a recording medium on which the moving image signals of a plurality of scenes recorded, a setting unit configured to set one of a first reproduction mode in which the reproduction unit reproduces one scene selected from the moving image signals of the plurality of scenes and a second reproduction mode in which the reproduction unit reproduces the moving image signals according to a playlist that designates the reproducing order of the moving image signals of the plurality of scenes, a conversion unit configured to convert the moving image signal recorded on the recording medium into a format designated by a transmission destination of the moving image signal, and to generate a converted moving image signal, and a control unit configured to control the conversion unit in response to a conversion instruction such that, in the first reproduction mode, the moving image signal of the one scene is divided on a unit basis of a predetermined time which is related to an upper limit time designated by the transmission destination of the moving image signal, and in the second reproduction mode, the moving image signals of the plurality of scenes are combined and the combined moving image signal is divided on the predetermined time basis.

Further features of the present invention will become apparent from the following description of exemplary embodiments with reference to the attached drawings.

BRIEF DESCRIPTION OF THE DRAWINGS

FIG. 3 is a table illustrating a conversion process according to a first embodiment of the present invention.

FIG. 12 is a table illustrating a conversion process according to a second embodiment of the present invention.

DESCRIPTION OF THE EMBODIMENTS

Preferred embodiments of the present invention will now be described in detail in accordance with the accompanying drawings.

First Embodiment

Figure 1:
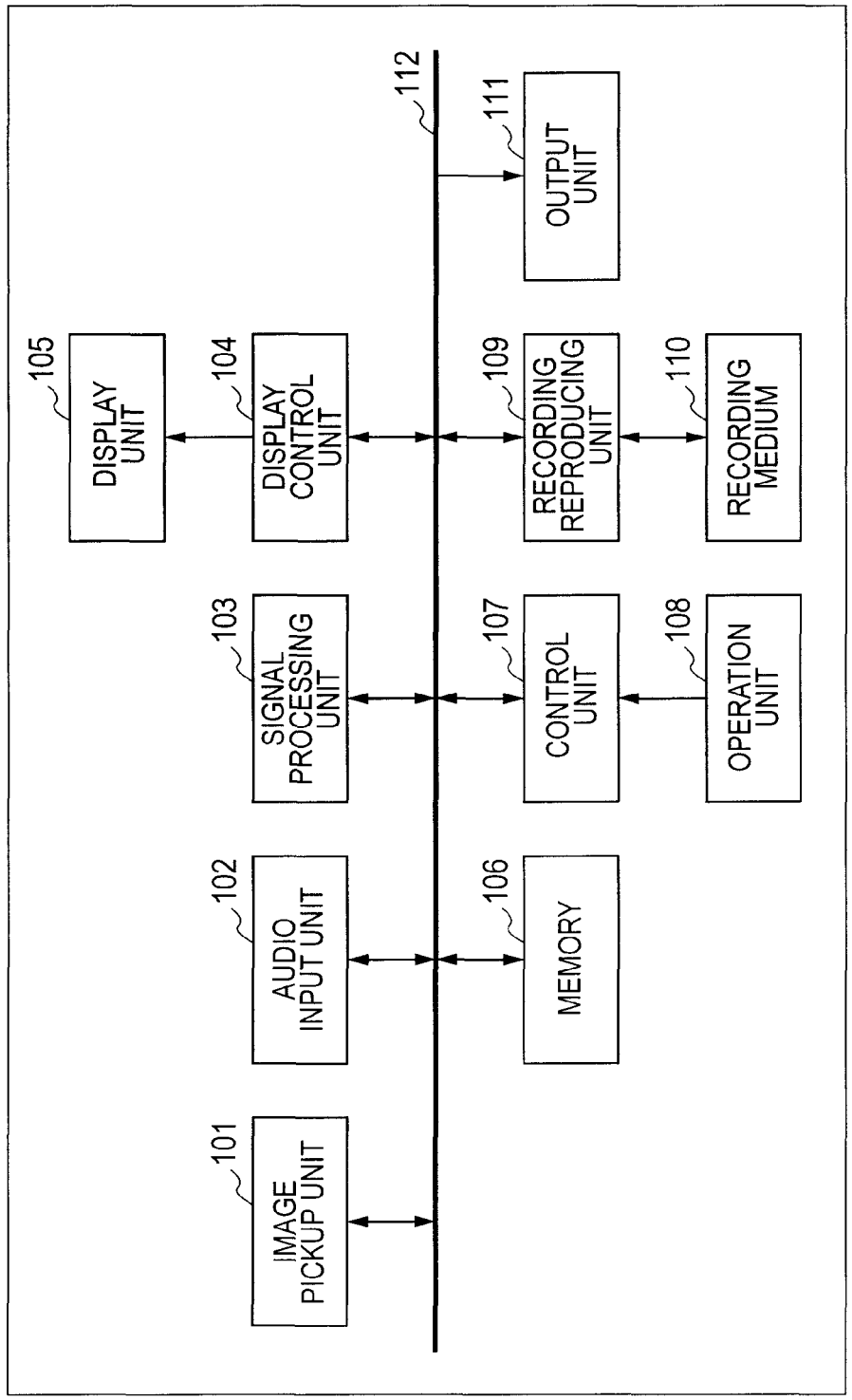
FIG. 1 is a block diagram illustrating a schematic configuration of a video camera according to one embodiment of the present invention.

FIG. 1 is a block diagram illustrating a schematic configuration of a video camera 100 according to one embodiment of the present invention.

In FIG. 1, an image pickup unit 101 photographs an object, generates a moving image signal representing the object, and outputs the resultant. The image pickup unit 101 includes an optical system such as a zoom lens or a focusing lens, an image pickup element such as a CCD, an AD converter that converts the output image signal from the image pickup element into a digital signal, and processing circuit that performs necessary processes to the photographed moving image, for example. In the present embodiment, the image pickup unit 101 generates a high definition (HD method) moving image signal of 60 frames/second, each frame including 1920 pixels in wide and 1020 pixels in height. An audio input unit 102 picks up ambient sound of the video camera 100, and outputs an audio signal. The audio input unit 102 includes a microphone, an amplifier, and an AD converter, for example, and outputs the picked-up audio signal as a digital signal.

A signal processing unit 103 encodes the photographed moving image signal according to an H.264 (MPEG4/AVC) method during the recording so as to compress the information quantity, and encodes the audio signal according to an AC3 method so as to compress the information quantity. The signal processing unit 103 decodes the compression-encoded moving image signal and the audio signal so as to expand the information quantity during the reproduction. The signal processing unit 103 also converts the moving image signal recorded on a recording medium 110 into a predetermined file format with a predetermined reproduction time. The signal processing unit 103 has a circuit that encodes and decodes the moving image signal in an MPEG2 method. During the conversion process, it temporary decodes the moving image signal, which is encoded with the H.264 method, and then, encodes again the same according to the MPEG2 method. During the reproduction of the moving image signal that is recorded as being converted into the MPEG2 method, this moving image signal is decoded in the MPEG2 method. A display control unit 104 displays a moving image and various information onto a display unit 105 according to the instruction from a control unit 107. The display unit 105 includes a known display device such as a liquid crystal panel, for example.

A memory 106 temporarily stores the moving image signal, the audio signal, and various information as described below. The control unit 107 controls the respective units in the video camera 100 according to the instruction from an operation unit 108. The operation unit 108 includes various switches such as a power source switch, a trigger switch that gives an instruction of starting and stopping the photographing of the moving image, a changeover switch to a reproduction mode, and a menu switch.

A recording reproducing unit 109 records or reproduces the moving image signal, the audio signal, and various information onto or from the recording medium 110 according to the instruction from the control unit 107. The recording medium 110 is the one, such as a memory card or a hard disk (HDD), which can be randomly accessed. In the present embodiment, the recording medium 110 can easily be loaded to or ejected from the video camera 110 by a not-illustrated loading ejecting mechanism. An output unit 111 outputs the moving image signal and the audio signal that are currently photographed, and reproduced moving image signal and the audio signal to the outside. An internal bus 112 is used to transfer various data and commands between the respective units in the video camera 100.

A basic operation in a photographing mode in the video camera 100 will be described. When a power of the video camera 100 is turned on by the operation unit 108, the control unit 107 controls the respective units to display a moving image of an object photographed by the image pickup unit 101 onto the display unit 105, and falls into a recording pause state. When an instruction of starting the photograph is given by the operation unit 108 in this state, the control unit 107 controls the respective units to start the recording of the moving image signal and the audio signal. The image pickup unit 101 and the audio input unit 102 store the moving image signal and the audio signal into the memory 106 through the bus 112 according to the instruction from the control unit 107. The signal processing unit 103 compression-encodes the moving image signal and the audio signal stored in the memory 106, and writes the compressed data (compressed moving image data and compressed audio data) back in the memory 106. The recording reproducing unit 109 reads the compressed data from the memory 106 and records the resultant onto the recording medium 110 according to the instruction from the control unit 107. The recording reproducing unit 109 manages the compressed moving image data and the compressed audio data, which are recorded on the recording medium 110, as a moving image file according to a predetermined file system. The recording reproducing unit 109 manages the recorded moving image signal and the audio signal of a series of scenes as one file during the period from the instruction of starting of the photographing to the instruction of stopping the photographing. The control unit 107 creates a management information file including the recorded position of each moving image file recorded on the recording medium 110 and various additional information, and records the resultant onto the recording medium 110.

When an instruction of stopping the photographing from the operation unit 108, the control unit 107 controls the recording reproducing unit 109 to stop recording the moving image signal and the audio signal onto the recording medium 110.

An operation of a reproduction mode will be described. The video camera 100 includes two reproduction modes. A first reproduction mode is a selected scene reproduction mode in which a scene selected by a user is reproduced from an index screen. A second reproduction mode is a playlist reproduction mode in which one or plural scenes designated by the playlist are continuously reproduced according to the playlist indicating a reproducing order of the recorded moving image. The user selects or sets one of the two reproduction modes by the operation unit 108.

When an instruction of changing the mode to the reproduction mode by the operation unit 108, the control unit 107 automatically sets the first reproduction mode (selected scene reproduction mode). The control unit 107 controls the recording reproducing unit 109 to reproduce a management file from the recording medium 110, and stores the same in the memory 106. The control unit 107 reads the head portion (top image) of the moving image signal, contained in the respective moving image files recorded on the recording medium 110, from the recording medium 110 based on the management file stored in the memory 106. Then, the signal processing unit 103 expands the read moving image signal, and supplies the resultant to the display control unit 104. The display control unit 104 reduces the size of the top image of the expanded moving image data by the signal processing unit 103 so as to generate a representative image (thumbnail image) of the scene. The display control unit 104 generates an index screen including a predetermined number of representative images, and displays the resultant on the display unit 105.

Figure 2A:
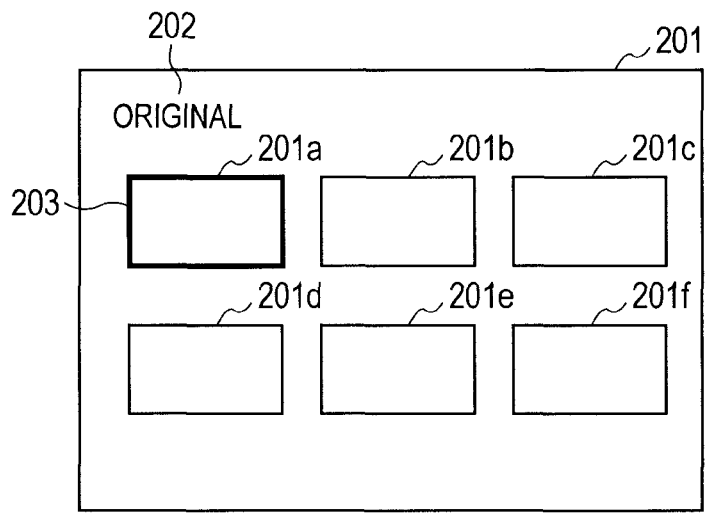
FIGS. 2A, 2B and 2C are views illustrating an index screen.

FIG. 2A is a view illustrating the index screen displayed when the mode is changed to the reproduction mode. Representative images 201a to 201f of six scenes are displayed on one index screen 201. On the index screen 201, information 202 indicating that the first reproduction mode is currently set, and a cursor 203 for allowing a user to select the scene he/she wishes to reproduce is displayed. When the user operates the operation unit 108 to move the cursor 203, he/she selects the scene he/she wishes to reproduce among the representative images of the respective scenes displayed on the index screen 201, and gives an instruction of the reproduction.

When the reproducing instruction is given, the control unit 107 controls the recording reproducing unit 109 so as to reproduce the moving image file corresponding to the selected representative image. The recording reproducing unit 109 reads the compressed data of the designated moving image file from the recording medium 110, and stores the resultant in the memory 106. The signal processing unit 103 reads and expands the compressed moving image data and the compressed audio data from the memory 106, and stores the obtained reproduction data in the memory 106. The display control unit 104 reads the reproduction image data stored in the memory 106, and supplies the same to the display unit 105. Thus, the reproduction image is displayed. The reproduction audio data is output from a not-illustrated speaker.

When the instruction of stopping the reproduction is given, the control unit 107 stops the reading of the moving image file by the recording reproducing unit 109, and displays again the index screen 201 onto the display unit 105.

Figure 2B:
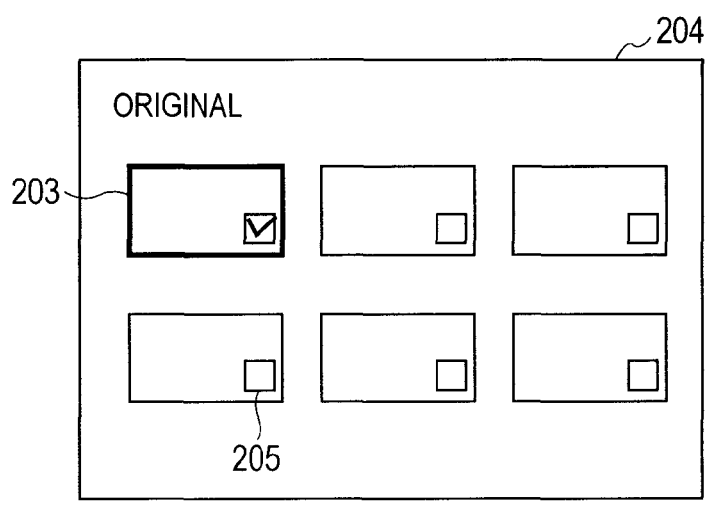

When the user operates the operation unit 108 to give an instruction of requesting the selection of plural scenes with the index screen 201 being displayed, the index screen 204 illustrated in FIG. 2B is displayed. On the index screen 204, check boxes 205 for selecting the respective representative images are displayed. The user operates the operation unit 108 to move the cursor 203, thereby selecting the scene he/she wishes to reproduce. A mark indicating that the scene is selected is displayed on the check box 205 of the selected scene.

When the instruction of starting the reproduction is given with the desired scene being selected as described above, the control unit 107 controls the respective units in such a manner that the moving image files of the selected plural scenes are continuously reproduced.

Next, a structure and operation of a playlist will be described. The playlist is a file on which the scenes selected by the user from the moving images of the plural scenes recorded on the recording medium 110 and the order of reproduction thereof are written. The video camera 100 can record one playlist file on one recording medium 110.

When the user operates the operation unit 108 to give an instruction of creating the playlist, the control unit 107 controls the respective units to display the index screen illustrated in FIG. 2A. When the user operates the operation unit 108 to select the scene he/she wishes to add to the playlist and to give an instruction of adding the scene in this state, the selected scene is added and registered to the playlist. The newly registered scene is designated on the playlist to be reproduced last.

The control unit 107 checks whether the playlist file is recorded on the recording medium 110. When the playlist file is not recorded, the control unit 107 newly creates a playlist for reproducing the designated scene. Then, the control unit 107 records the created playlist file onto the recording medium 110 by the recording reproducing unit 109. When the playlist file is recorded onto the recording medium 110, the control unit 107 reproduces the playlist file from the recording medium 110 by the recording reproducing unit 109, and stores the same in the memory 106. Then, the control unit 107 adds the newly designated scene to the playlist.

When the user gives an instruction of displaying the playlist in the first reproduction mode in the state in which the index screen 201 or 204 is displayed, the control unit 107 changes the video camera 100 to the second reproduction mode. The control unit 107 then reads the playlist file from the recording medium 110 by the recording reproducing unit 109, and stores the same in the memory 106. The control unit 107 controls the respective units in such a manner that it detects the scene designated by the playlist, and creates and displays the index screen including the representative image of each scene.

Figure 2C:
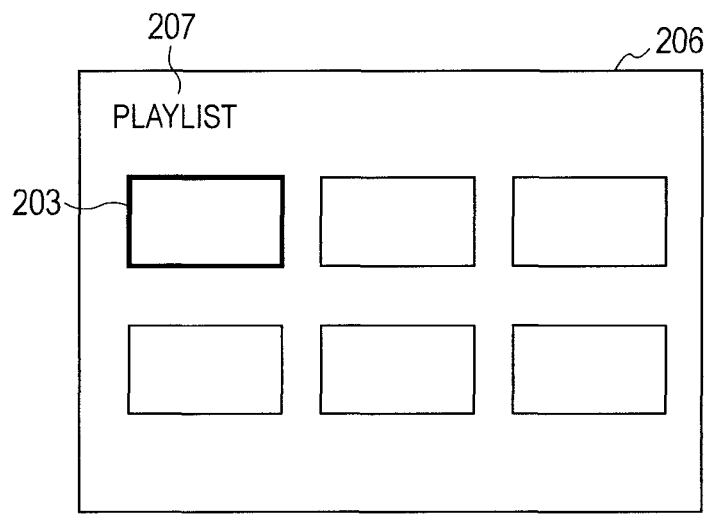

FIG. 2C is a view illustrating the index screen displayed in the second reproduction mode. On the index screen 206, information 207 indicating that the mode is the second reproduction mode, and a cursor 203 for selecting each scene designated by the playlist are displayed. The user moves the cursor 203 to select the scene he/she wishes to reproduce. When an instruction of starting the reproduction is given with the desired scene being selected, the control unit 107 controls the respective units in such a manner that the plural moving image files after the selected scene are continuously reproduced in the reproducing order designated by the playlist.

When the user wishes to change the reproducing order of the scenes registered in the playlist, the user operates the operation unit 108 to give an instruction of changing the playlist with the index screen 206 illustrated in FIG. 2C being displayed. Specifically, after the scene whose order is intended to be changed is selected, a reproduction position after the change is designated. When the reproducing order of the playlist is changed, the control unit 107 changes the playlist file stored in the memory 106, and records the resultant to the recording medium 110 by the recording reproducing unit 109.

A conversion process of a length and format of a moving image and an audio will be described. In the present embodiment, the format of the moving image and audio recorded on the recording medium 110 can be converted into a format suitable for being stored or saved in an external recording medium such as a DVD. In the present embodiment, the moving image or audio recorded on the recording medium 110 can be converted into a format suitable for being stored or saved (uploaded) in a server designated by a moving image sharing service on a network. During the conversion process, a storage-destination format or a transmission-destination format is automatically changed according to the storage destination of the moving image or the audio subjected to the conversion, and the reproduction mode at a time when the conversion process is instructed.

FIG. 3 is a view illustrating the conversion process in the video camera 100. In the present embodiment, two different types of storages, which are a DVD and a server (Web) on the network, are prepared as the storage destination of the converted moving image and the audio data. When the format of the moving image or the audio is converted in order to be recorded on the DVD, the format is converted such that the converted scene becomes the same as the original scene. On the other hand, when the format of the moving image or the audio is converted in order to be stored on the server, there may be the case in which the moving image or the audio cannot be stored if the scene is too long. Therefore, an upper limit is imposed on the length of one scene of the converted moving image or the audio data. When the reproduction time of the scene to be subjected to conversion exceeds the upper-limit value specified by the moving image sharing service as the upload destination of the moving image, the scene is converted after it is divided. In the present embodiment, the upper-limit value of the reproduction time after the conversion, i.e., the upper-limit time is set to be ten minutes.

When the instruction of the conversion is given with the first reproduction mode being set, it is regarded that there is no exact continuity between the scenes that become the conversion subjects, whereby the respective scenes are individually converted. On the other hand, in the second reproduction mode, since the user designates the reproducing order, it is regarded that there may be a meaningful relationship between scenes, whereby the plural scenes designated by the playlist are combined and converted into the transmission-destination format. With this process, the plural scenes can be integrated into one scene.

Figure 4A:
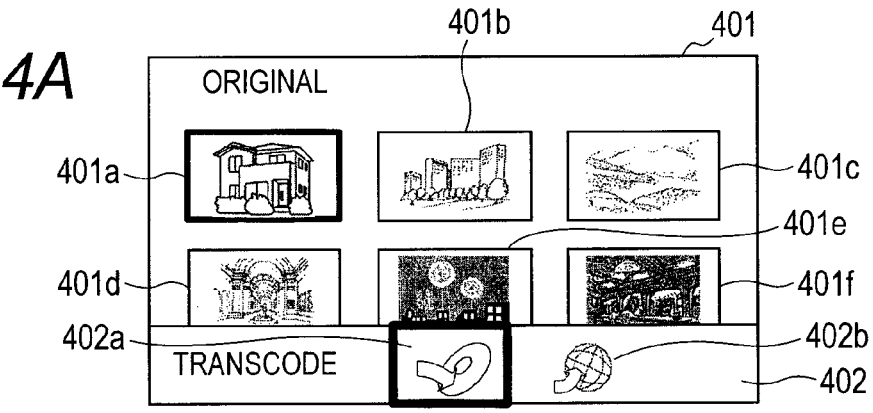
FIGS. 4A, 4B, 4C and 4D are views illustrating a display screen during the conversion process according to the first embodiment of the present invention.

FIGS. 4A to 4D are views illustrating the display screen during the conversion process. For example, it is supposed that the user selects one scene and given an instruction of the conversion process in the state in which the first reproduction mode is set, and the index screen 201 in FIG. 2A is displayed. In this case, a storage destination selection screen 401 in FIG. 4A is displayed. Representative images 401a to 401f and information 402 for selecting the storage destination after the conversion are displayed on the screen 401. In the information 402, an icon 402a represents the DVD, while an icon 402b represents Web.

Figure 4B:
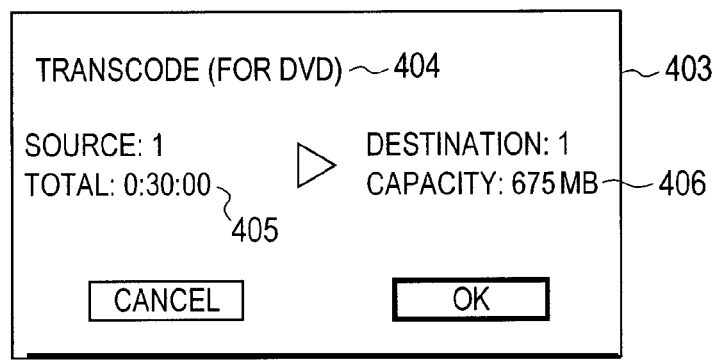

When the user operates the operation unit 108 to select the icon 402a indicating the DVD, in the displayed information 402 of the storage destination, a confirmation screen 403 in FIG. 4B is displayed instead of the screen 401. Information 404 indicating the storage destination, information 405 indicating the number of the scenes and the reproduction time of the original of the conversion, and information 406 indicating the number of scenes (number of files) after the conversion and the total data quantity (size) are displayed on the screen 403.

Figure 4C:
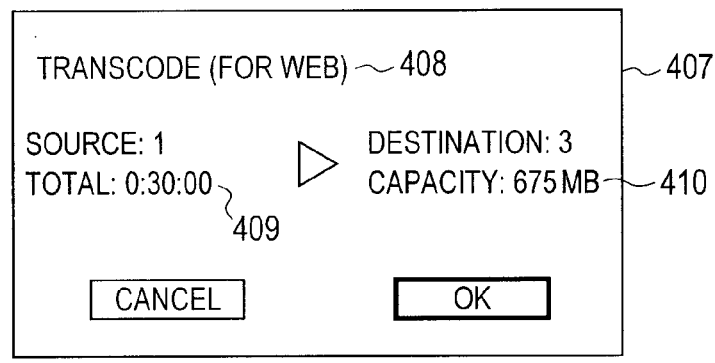
Figure 4D:
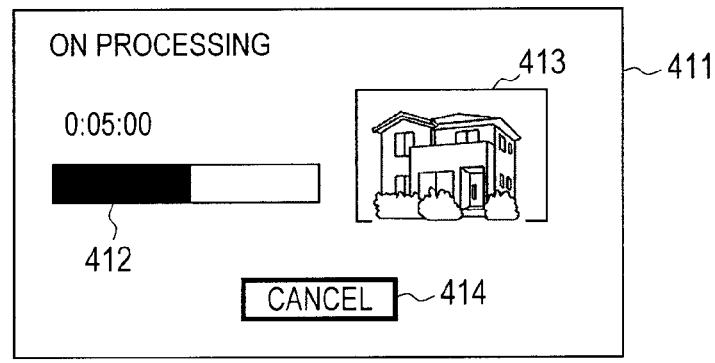

When the user operates the operation unit 108 to select the icon 402b indicating the Web on the selection screen 401, a confirmation screen 407 in FIG. 4C is displayed instead of the screen 401. Information 408 indicating the storage destination, information 409 indicating the number of the scenes and the reproduction time of the original of the conversion, and information 410 indicating the number of scenes (number of files) after the conversion and the total data quantity (size) are displayed on the screen 407.

When the user gives an OK instruction with the confirmation screen 403 or 407 being displayed, the conversion process is started, and a screen 411 (FIG. 4D) indicating that the conversion process is currently executed is displayed instead of the confirmation screen 403. A progress bar 412 indicating the progress status of the conversion process and a representative image 413 of the scene to be subject to the conversion are displayed on the screen 411. When the user selects a cancel button, he/she can give an instruction of stopping the conversion process.

In the present embodiment, the conversion process can be instructed in the state in which the plural scenes are selected in the first reproduction mode as illustrated in FIG. 2B. Further, the conversion process can be instructed in the state in which the second reproduction mode is set as illustrated in FIG. 2C. In this case, the information 402 for selecting the storage destination is also displayed as in FIG. 4A.

Figure 5:
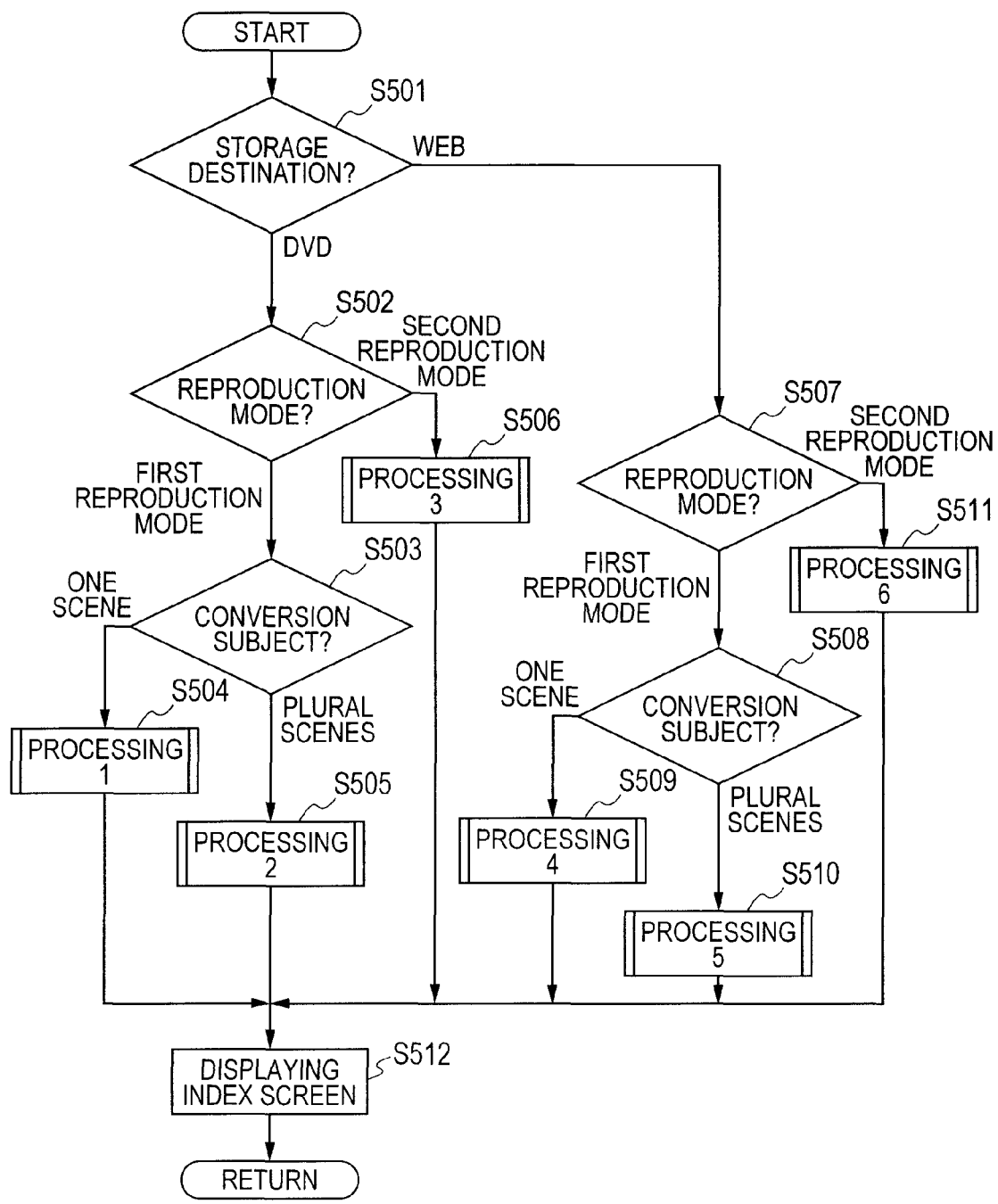
FIG. 5 is a flowchart illustrating the conversion process according to the first embodiment of the present invention.

FIG. 5 is a flowchart illustrating the conversion process. The conversion process described here is executed through the control of the respective units by the control unit 107.

The control unit 107 firstly determines which one of the DVD and the Web is selected as the storage destination (S501). If the DVD is selected, the control unit 107 further determines which one of the first reproduction mode and the second reproduction mode is selected as the current reproduction mode (S502). When the second reproduction mode, i.e., the reproduction of the playlist is set (S502), the control unit 107 executes processing 3 that converts plural scenes designated by the playlist (S506).

When the first reproduction mode is set (S502), the control unit 107 further determines whether one scene is selected or plural scenes are selected as the conversion subject (S503). When the instruction of the conversion is issued with the index screen 201 in FIG. 2A being displayed as described above, one scene is selected. When the plural scenes are selected on the index screen 204 in FIG. 2B, the plural scenes are selected as the conversion subject. When one scene is selected (S503), the control unit 107 executes processing 1 that converts the selected one scene (S504). When the plural scenes are selected, the control unit executes processing 2 that converts all of the selected plural scenes (S505).

If the Web is selected as the storage destination (S501), the control unit 107 determines which one of the first reproduction mode and the second reproduction mode is selected as the current reproduction mode (S507). If the second reproduction mode is selected (S507), the control unit 107 executes processing 6 that divides each scene designated by the playlist on a ten minutes basis (S511). If the first reproduction mode is selected (S507), the control unit 107 further determines whether one scene is selected or plural scenes are selected as the conversion subject (S508). If one scene is selected (S508), the control unit 107 executes processing 4 that divides the selected one scene on a ten minutes basis (S509). If the plural scenes are selected, the control unit 107 executes processing 5 in which all of the selected plural scenes are combined and the combined moving image is divided on a ten minutes basis (S510).

When the conversion process (S504, S505, S506, S509, S510, S511) to the transmission-destination format is completed, the control unit 107 displays the index screen, which is displayed at the point when the instruction of the conversion process is issued, on the display unit 105 (S512), and then, ends the processing.

Figure 6:
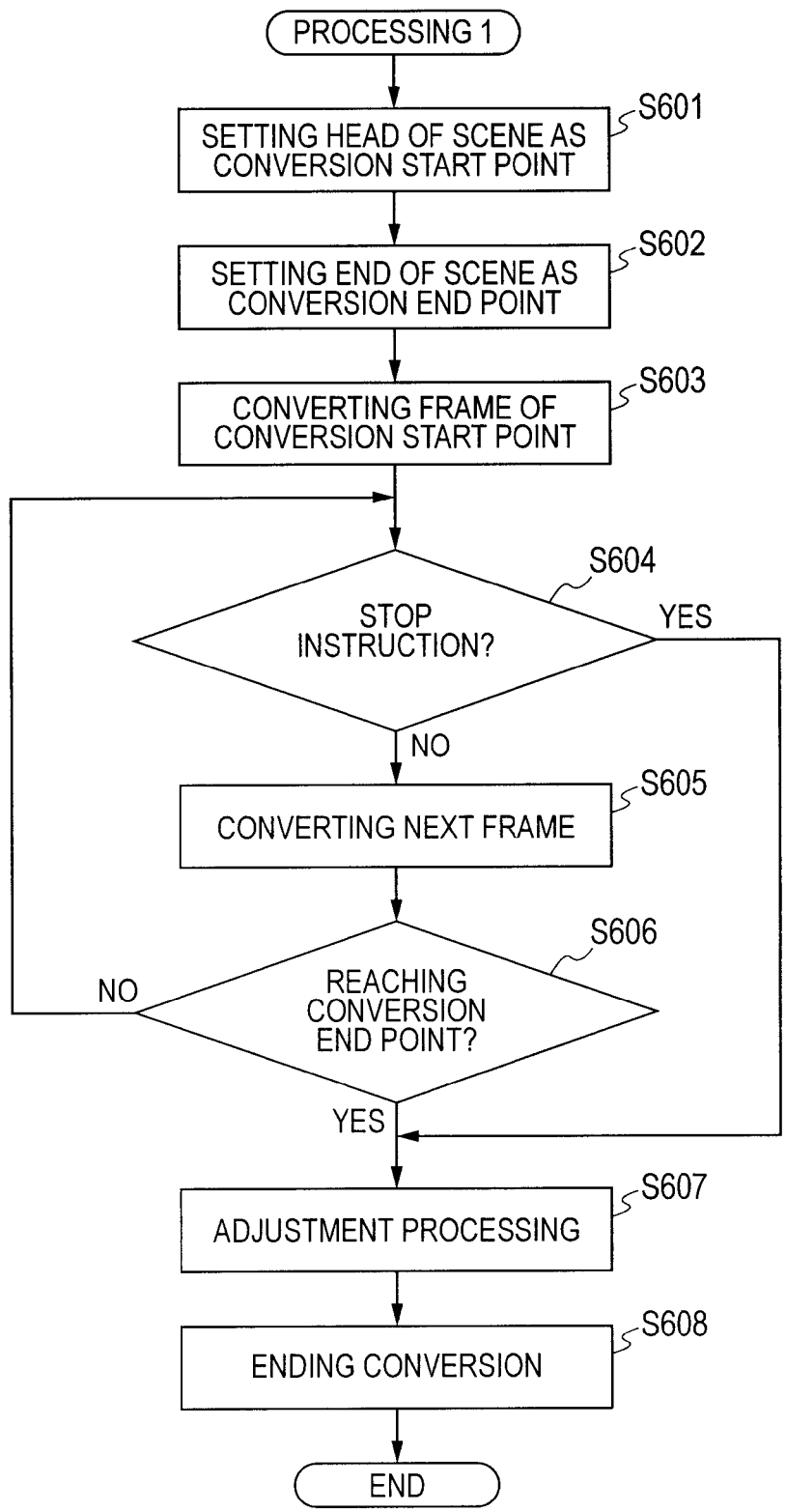
FIG. 6 is a flowchart illustrating the conversion process according to the first embodiment of the present invention.

FIG. 6 is a flowchart illustrating the processing 1. The processing 1 is a process for converting a moving image file of the selected one scene. The control unit 107 firstly sets a top frame of the selected scene as a conversion start point (S601), and sets a last frame of the scene as a conversion end point (S602). Then, the control unit 107 reproduces the moving image file of the selected scene from the recording medium 110 by the recording reproducing unit 109, and executes the conversion process for the top one frame (S603).

In the present embodiment, high-definition (HD) moving image data is encoded according to the H.246 method, and recorded onto the recording medium 110 by the video camera 100. In order to copy the moving image recorded on the recording medium 110 as described above onto a DVD, the encoding format of the moving image data recorded on the recording medium 110 is converted into MPEG2 that is the encoding format of a DVD video. Therefore, the compressed moving image data of the selected scene is read to the memory 106 from the recording medium 110. The signal processing unit 103 expands the compressed moving image data stored in the memory 106, and writes the obtained reproduction moving image data back in the memory 106. The signal processing unit 103 reads the reproduction moving image data from the memory 106, reduces a number of pixels of one frame, compression-encodes the resultant according to the MPEG2 method, and then, stores the obtained MPEG2 data in the memory 106. The recording reproducing unit 109 reads the MPEG2 data from the memory 106, and records the same onto the recording medium 110. In this case, the converted moving image signal and the audio signal are recorded as one moving image file. Further, identification information indicating that it is the moving image file recorded by the conversion process is also recorded.

In the H.264 method and MPEG2 method, the encoding is performed on a unit basis of so-called GOP (Group of Pictures). The GOP includes frame image data (I frame) encoded in a frame and inter-frame prediction encoded frame image data (P, B frame) in a predetermined number. Therefore, the signal processing unit 103 stores the reproduction moving image data in the memory 106 on the GOP basis, and performs the compression encoding according to the MPEG2 method on the GOP basis. Since a high-definition (HD) moving image cannot be handled by a DVD video, the number of pixels of one frame (screen size) is reduced, and then, encoded according to the MPEG2 method. In the present embodiment, the number of pixels of one frame is reduced to 640 pixels×480 pixels from 1920 pixels×1080 pixels.

The compressed audio data contained in the moving file of the selected scene is also temporarily stored in the memory 106. It is read from the memory 106 according to the conversion process of the moving image data, and again recorded onto the recording medium 110 as one moving image file together with the moving image data converted into the MPEG2 method. In the present embodiment, the audio signal is recorded as being encoded according to AC3 method, and during the conversion process, the encoding format of the audio signal is not converted.

After the start of the conversion process, the control unit 107 determines whether the instruction of stopping the process is issued by a user (S604). If the stop instruction is not issued, the control unit 107 converts the next frame (S605), and determines whether it reaches the conversion end point (S606). When it does not reach the conversion end point (S606), the control unit 107 returns to step S604 to continue the processing.

When it reaches the conversion end point (S606), or if the stop instruction is issued (S604), the control unit 107 stops the conversion process of the new frame, and adjusts the converted moving image data (S607). Specifically, if the frame reaching the conversion end point or the frame to which the stop instruction is issued is not integer times of GOP when viewed from the head, the same frame is encoded to the last of the GOP after that. Then, the conversion process is ended (S608).

Figure 7:
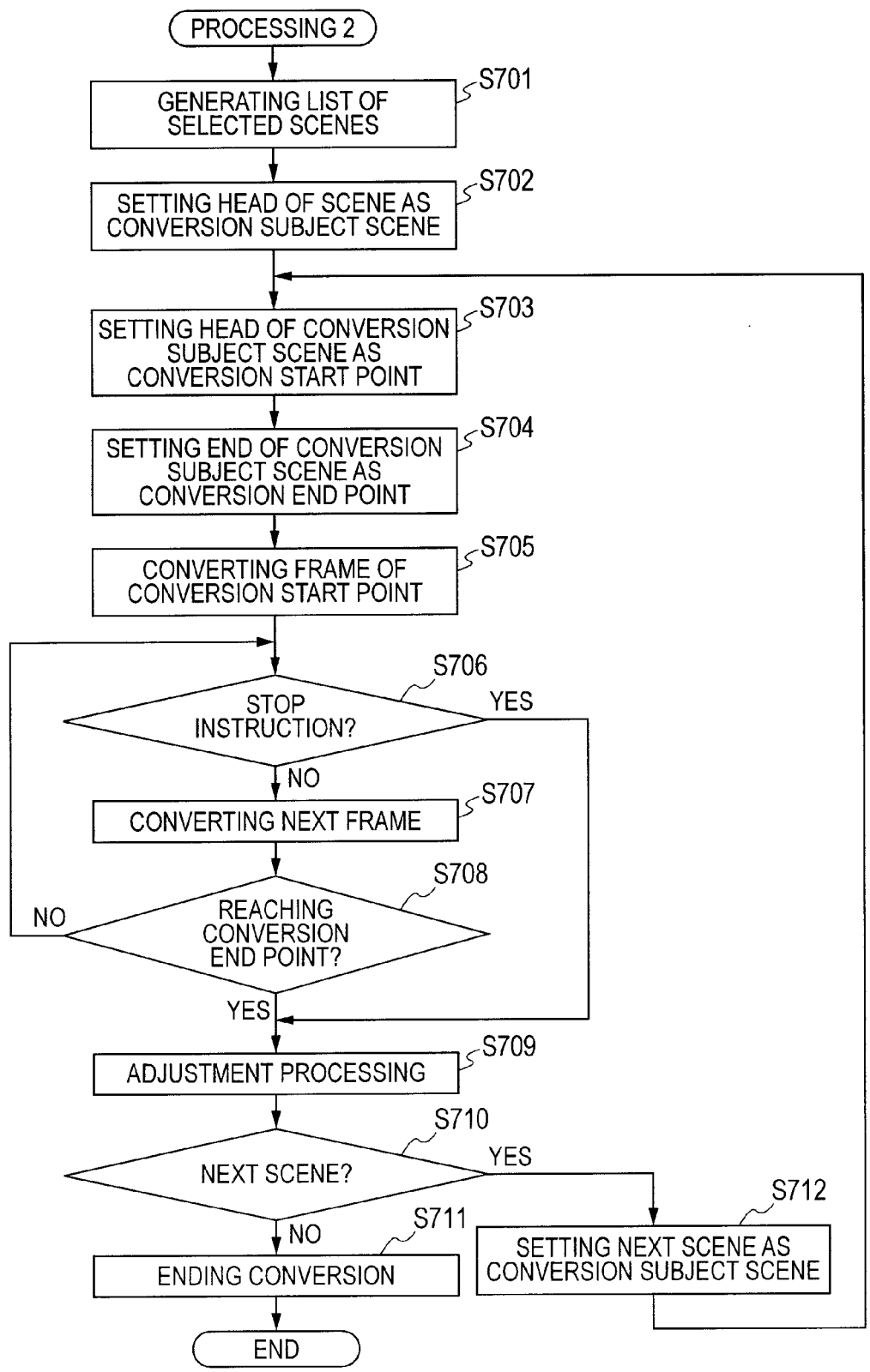
FIG. 7 is a flowchart illustrating the conversion process according to the first embodiment of the present invention.

FIG. 7 is a flowchart illustrating the processing 2. The processing 2 is the processing that converts all moving image files of the selected scene. The control unit 107 firstly generates information of a list of the selected scenes, and stores the resultant in the memory 106 (S701). For example, when two scenes are selected on the index screen in FIG. 2B, the information indicating the file numbers of these two scenes is generated.

Next, the control unit 107 sets the head of the scene among the selected scenes as the conversion subject (S702). The control unit 107 sets the top frame of the scene to be subjected to the conversion to be the conversion start point (S703), while setting the last frame of the scene to be the conversion end point (S704). Then, the control unit 107 reproduces the moving file of the scene to be subjected to the conversion by the recording reproducing unit 109, and executes the conversion process for the frame at the conversion start point (S705).

After the start of the conversion process, the control unit 107 determines whether the instruction of stopping the process is issued by a user (S706). If the stop instruction is not issued (S706), the control unit 107 converts the next frame (S707), and determines whether it reaches the conversion end point (S708). When it does not reach the conversion end point (S708), the control unit 107 returns to step S706 to continue the processing.

When it reaches the conversion end point (S708), or if the stop instruction is issued (S706), the control unit 107 stops the conversion process of the new frame, and applies the adjustment process same as that in step S607 to the converted moving image data (S709). The control unit 107 then determines whether there is a scene that should be converted next based on the information of the list of the selected scenes (S710). If there is a next scene (S710), the control unit 107 designates the next scene as the conversion subject scene (S712), and returns to step S703. If there is no next scene (S710), which means the conversion process for all selected scenes is completed, the control unit 107 records the converted moving image file to the recording medium 110, and ends the conversion process (S711).

Figure 8:
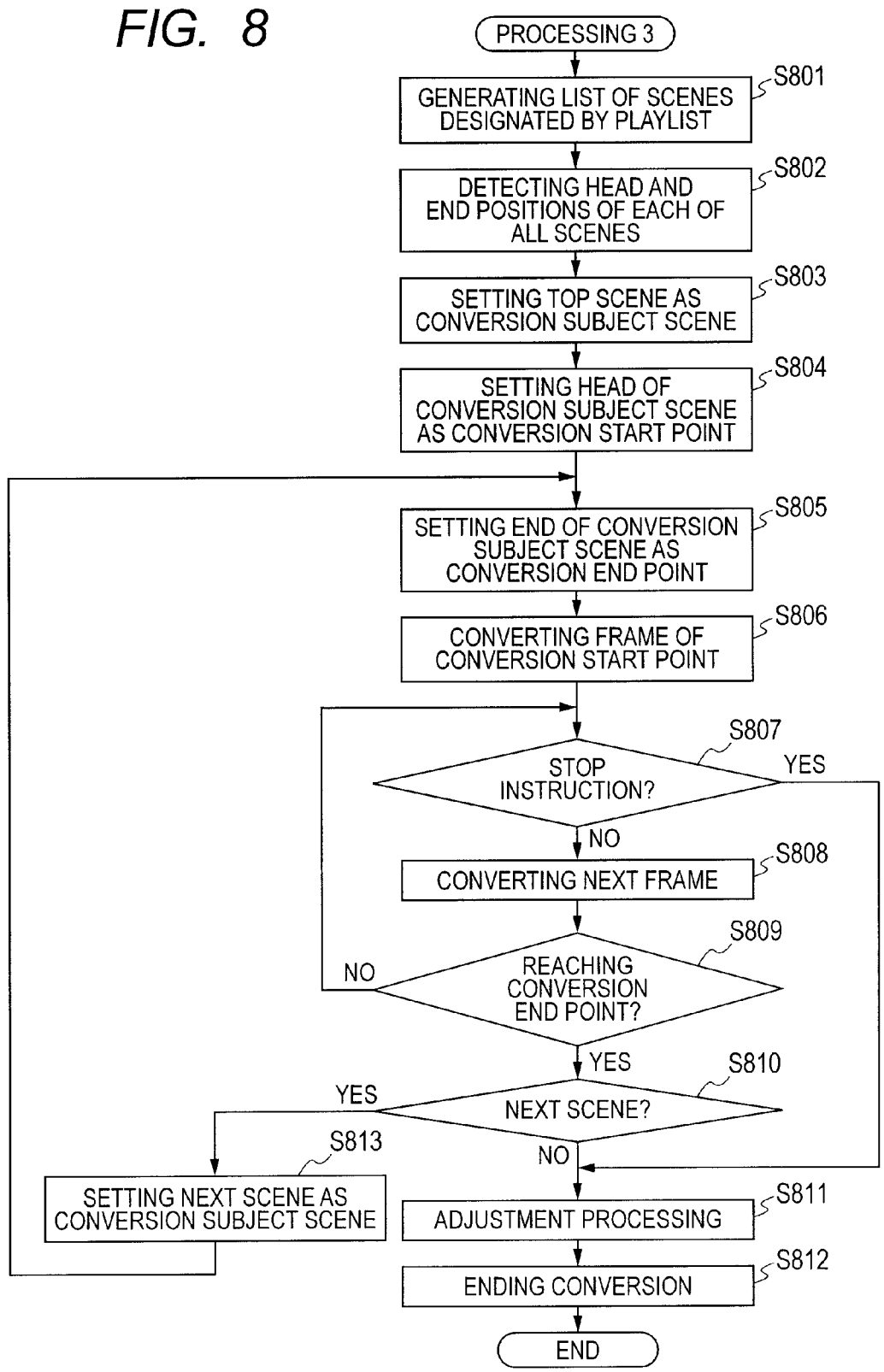
FIG. 8 is a flowchart illustrating the conversion process according to the first embodiment of the present invention.

FIG. 8 is a flowchart illustrating the processing 3. The processing 3 is the processing in which the moving files of the plural scenes designated by the playlist are combined, and the combined moving image is converted. The control unit 107 generates information of a list of the scenes designated by the playlist, and stores the resultant in the memory 106 (S801). Then, the control unit 107 detects the head and end positions of each of all scenes designated by the playlist (S802).

The control unit 107 sets the top scene of the scenes designated by the playlist as the conversion subject scene (S803). Further, the control unit 107 sets the frame at the head of the conversion subject scene as the conversion start point (S804), while sets the frame at the end of the scene as the conversion end point (S805). The control unit 107 reproduces the moving image file of the conversion subject scene by the recording reproducing unit 109, and executes the conversion process to the frame at the conversion start point (S806).

After the start of the conversion process, the control unit 107 determines whether the instruction of stopping the process is issued by a user (S807). If the stop instruction is not issued (S807), the control unit 107 converts the next frame (S808), and determines whether it reaches the conversion end point (S809). When it does not reach the conversion end point (S809), the control unit 107 returns to step S807 to continue the processing.

When it reaches the conversion end point (S809), the control unit 107 determines whether there is a next scene on the basis of the information of the list of the scenes designated by the playlist (S810). If there is a next scene (S810), the control unit 107 sets the next scene as the conversion subject scene (S813), and then, returns to step S804.

If the stop instruction is issued (S807), or when the conversion process for the last scene designated by the playlist is completed (S810), the control unit 107 performs the adjustment process same as that in step S607 (S811). The control unit 107 then records the moving image file after the adjustment process onto the recording medium 110, and ends the conversion process (S812).

Figure 9:
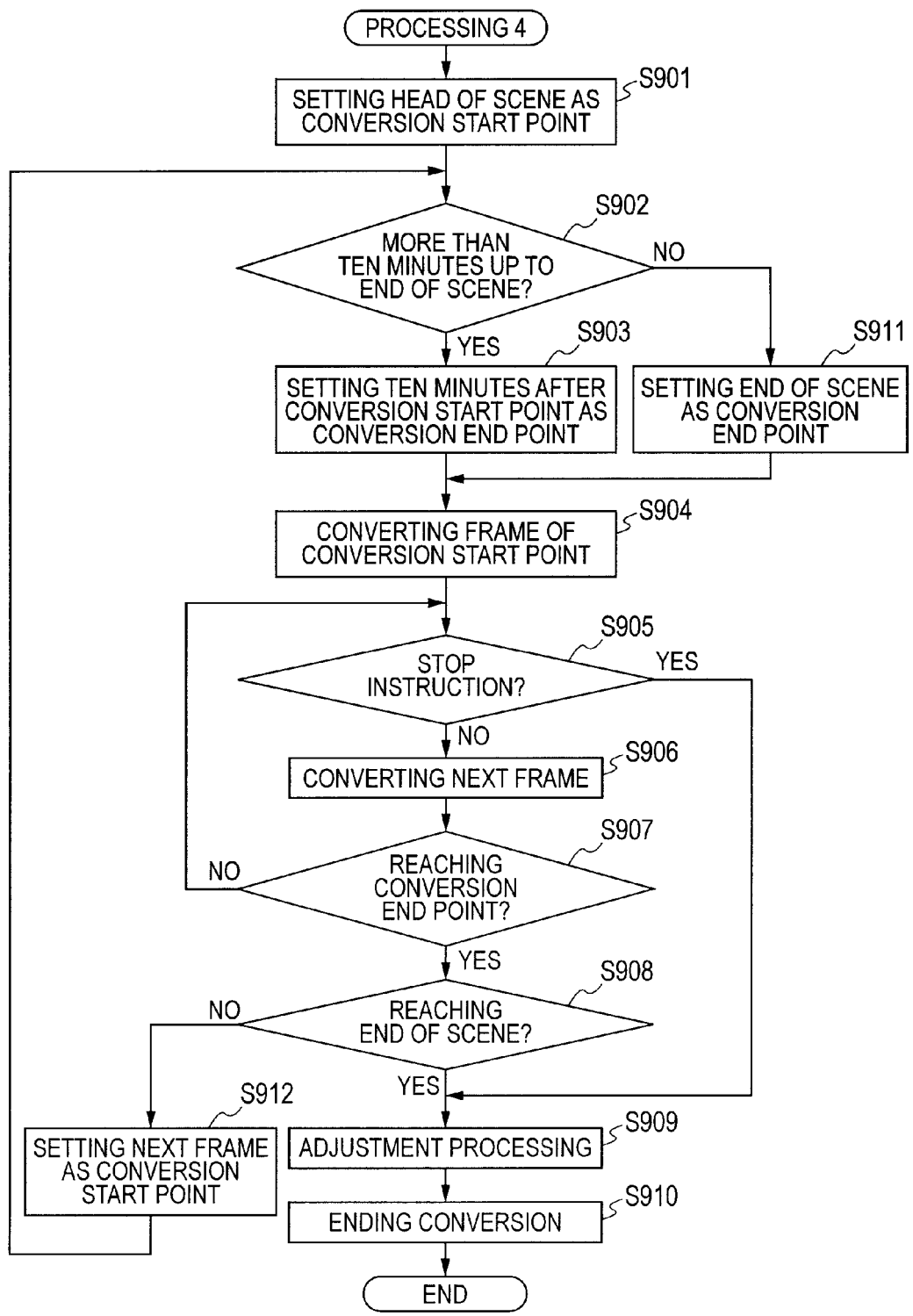
FIG. 9 is a flowchart illustrating the conversion process according to the first embodiment of the present invention.

FIG. 9 is a flowchart illustrating the processing 4. The processing 4 is the processing that divides the moving image file of the selected one scene on the unit basis of ten minutes that is the upper limit time. The processing 4 to the processing 6 is those executed when the Web is selected as the storage destination. In the above processing, the moving image is encoded according to the MPEG2, like the processing 1 to the processing 3. The audio signal is according to the AC3 method. The screen size of the converted moving image is the same as that in the processing 1 to the processing 3.

The control unit 107 firstly sets the frame at the head of the selected scene as the conversion start point (S910). The control unit 107 then determines whether the reproduction time from the conversion start point to the end of the scene is more than ten minutes (S902). When it is more than ten minutes (S902), the control unit 107 sets the frame ten minutes from the conversion start point as the conversion end point (S903). When the time from the conversion start point to the end of the scene is less than ten minutes (S902), the control unit 107 sets the last frame of the scene as the conversion end point (S911).

Then, the control unit 107 reproduces the moving image file of the scene selected from the recording medium 110 by the recording reproducing unit 109, and executes the conversion process on one frame at the head (S904).

After the start of the conversion process, the control unit 107 determines whether the instruction of stopping the process is issued by a user (S905). If the stop instruction is not issued (S905), the control unit 107 converts the next frame (S906), and determines whether it reaches the conversion end point (S907). When it does not reach the conversion end point (S907), the control unit 107 returns to step S905 to continue the processing.

When it reaches the conversion end point (S907), the control unit 107 temporarily closes the converted moving image file, and stops the conversion process. Thereafter, the control unit 107 determines whether it reaches the end of the scene (S908). The adjustment process is unnecessary at this stage. In the present embodiment, a moving image signal in an NTSC method is recorded, and one GOP after the conversion is composed of 15 frames. The NTSC method is performed with a moving image of 30 frames per second. Accordingly, when the conversion end point is other than the end of the scene, the reproduction time of the converted moving image is integer times as long as that of GOP, so that the adjustment process is unnecessary.

When it does not reach the end of the scene (S908), the control unit 107 sets the next frame as the conversion start point (S912), and returns to step S902. After that, a newly converted moving image signal is recorded as a new moving image file.

When it reaches the end of the scene (S908), or if the stop instruction is issued (S905), the control unit 107 stops the conversion process for the new frame, and executes the adjustment process as in step S607 (S909). Then, the control unit 107 records the moving image file after the adjustment process onto the recording medium 110, and ends the conversion process (S910).

Figure 10:
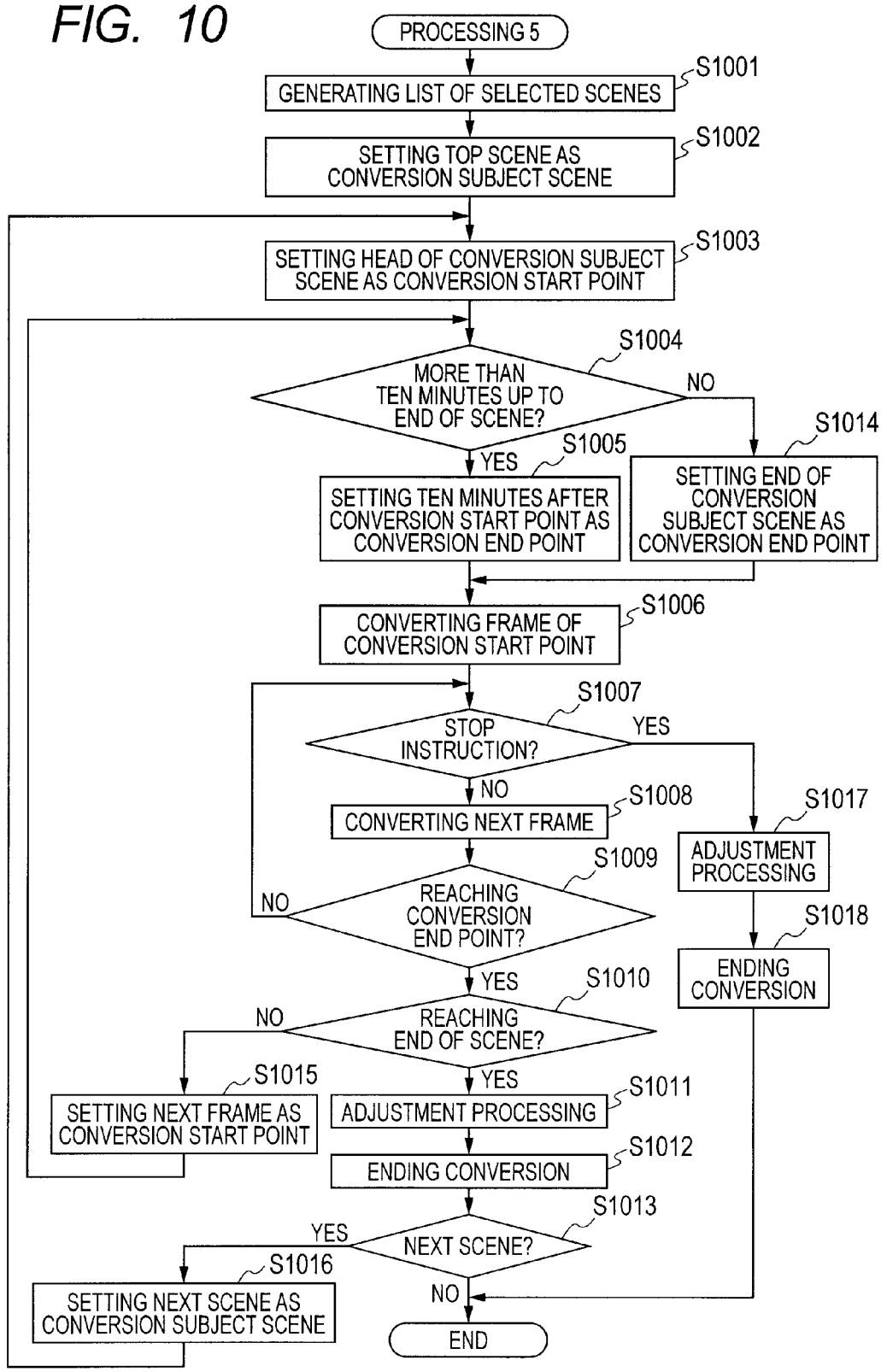
FIG. 10 is a flowchart illustrating the conversion process according to the first embodiment of the present invention.

FIG. 10 is a flowchart illustrating the processing 5. The processing 5 is the one in which all of the selected plural scenes selected in the first reproduction mode are combined, and the combined moving image is divided on the unit basis of ten minutes that is the upper limit time.

The control unit 107 firstly generates information of a list of the selected scenes, and stores the resultant in the memory 106 (S1001). Then, the control unit 107 designates the top scene of the selected scenes as the conversion subject scene (S1002), and sets the frame at the head of the conversion subject scene as the conversion start point (S1003). The control unit 107 then determines whether the reproduction time from the conversion start point to the end of the conversion subject scene is more than ten minutes (S1004). When it is more than ten minutes (S1004), the control unit 107 sets the frame ten minutes from the conversion start point as the conversion end point (S1005). On the other hand, when the time from the conversion start point to the end of the scene is less than ten minutes (S1004), the control unit 107 sets the frame at the end of the scene as the conversion end point (S1014). The control unit 107 then reproduces the moving image file of the scene selected from the recording medium 110 by the recording reproducing unit 109, and executes the conversion process on the frame at the conversion start point (S1006).

After the start of the conversion process, the control unit 107 determines whether the instruction of stopping the process is issued by a user (S1007). If the stop instruction is not issued (S1007), the control unit 107 converts the next frame (S1008), and determines whether it reaches the conversion end point (S1009). When it does not reach the conversion end point (S1009), the control unit 107 returns to step S1007 to continue the processing.

When it reaches the conversion end point (S1009), the control unit 107 temporarily closes the converted moving image file, and stops the conversion process. Thereafter, the control unit 107 determines whether it reaches the end of the scene (S1010). When it does not reach the end of the scene (S1010), the control unit 107 sets the next frame as the conversion start point (S1015), and then, returns to step S1004. After that, a newly converted moving image signal is recorded as a new moving image file.

When it reaches the end of the scene (S1010), the control unit 107 stops the conversion process for the new frame at this point, and applies the adjustment process same as that in step S607 to the converted moving image data (S1011). Then, the control unit 107 ends the conversion process to the current conversion subject scene (S1012), and then, determines whether there is a scene that should be converted next (S1013). If there is a next scene (S1013), the control unit 107 designates the next scene as the conversion subject scene (S1016), and returns to step S1003. If there is no next scene (S1013), the conversion process is ended.

If the stop instruction is issued (S1009), the control unit 107 executes the adjustment process as in step S607 (S1017). Then, the control unit 107 records the moving image file after the adjustment process onto the recording medium 110, and ends the conversion process (S1018).

Figures 11, 11A, 11B:
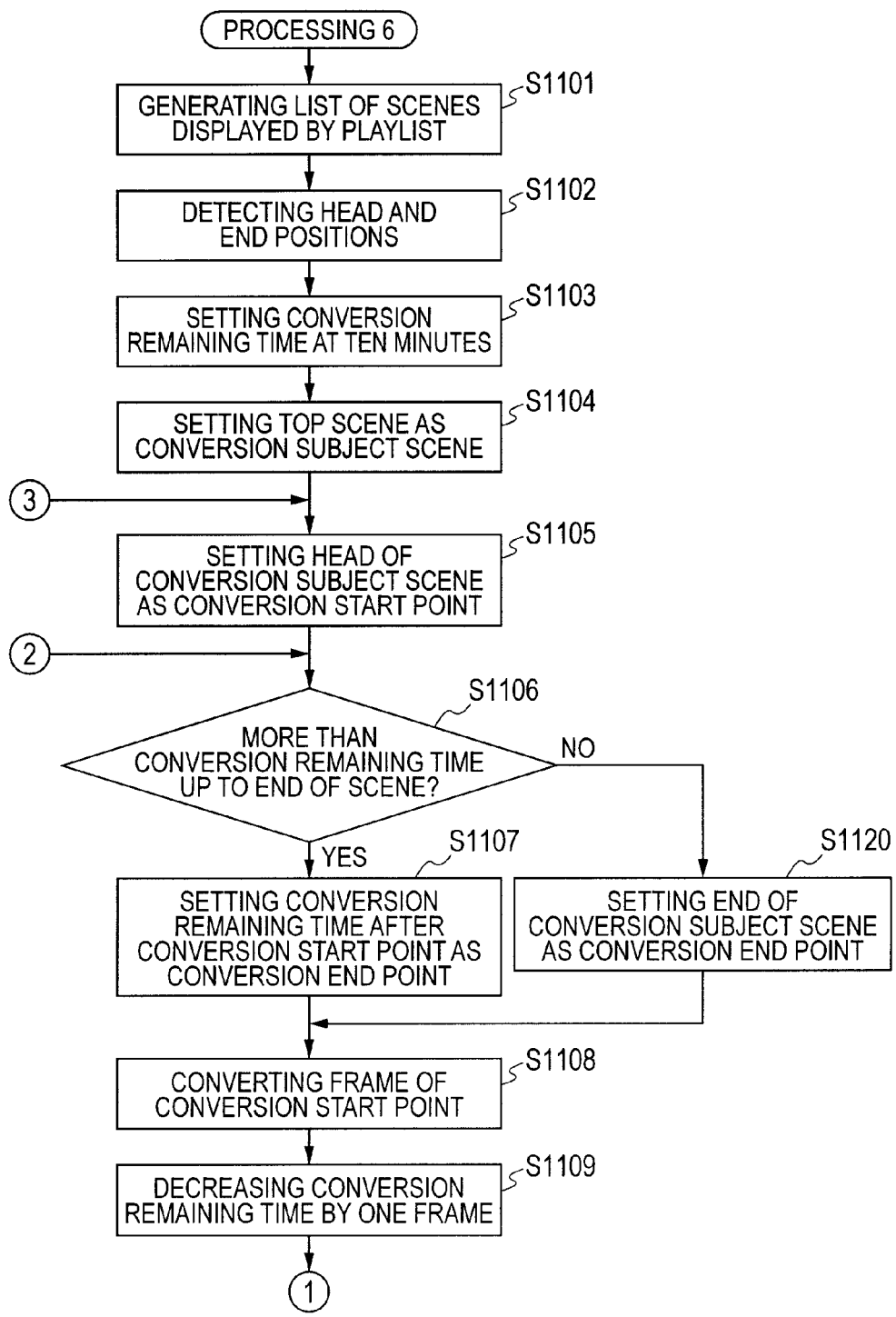
FIG. 11 is comprised of FIGS. 11A and 11B showing flowcharts illustrating the conversion process according to the first embodiment of the present invention.
Figure 11B:
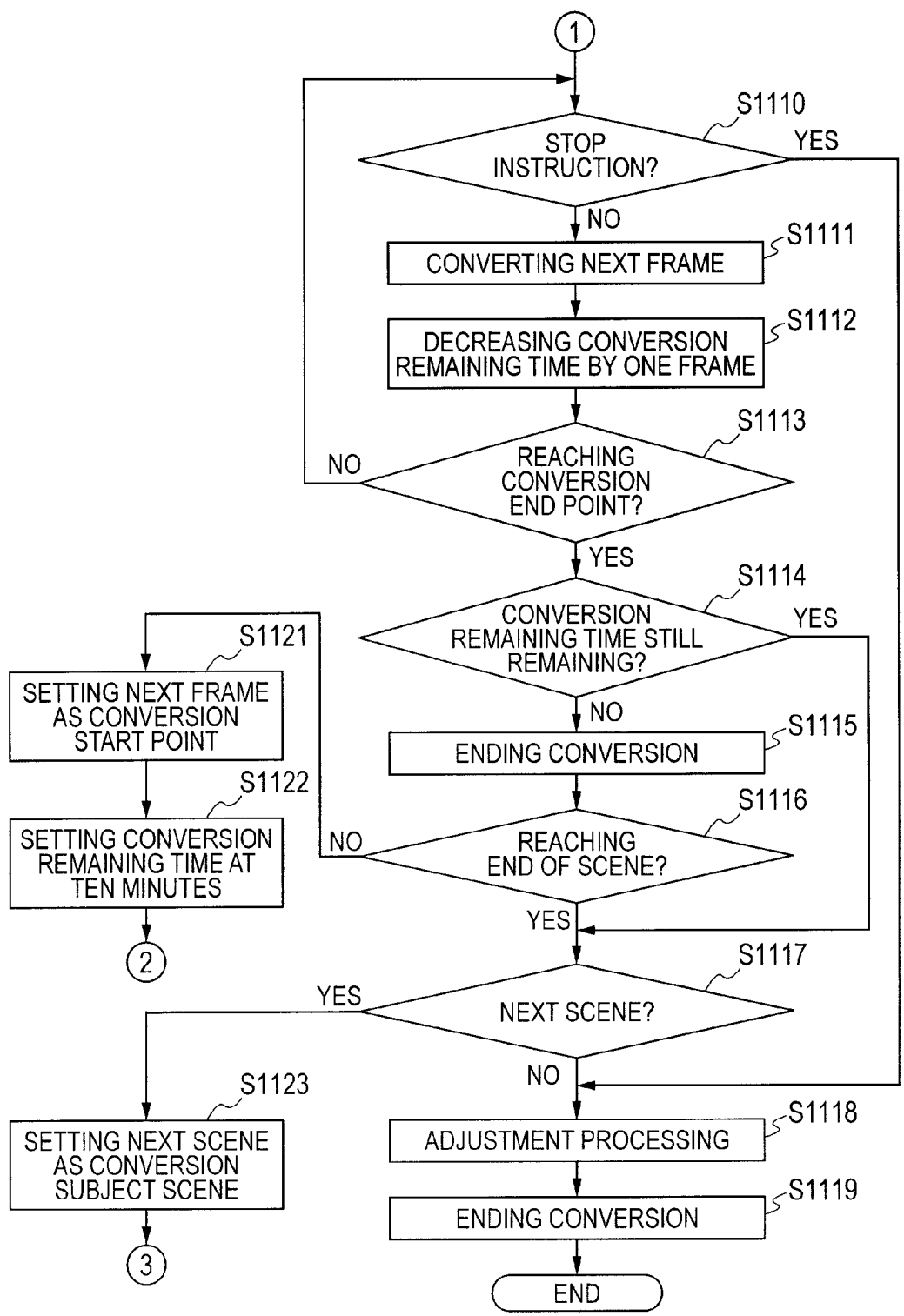

FIGS. 11A and 11B are flowcharts illustrating the processing 6. The processing 6 is the one in which the moving images of all of the plural scenes designated by the playlist are combined, and the combined moving image is divided on the unit basis of ten minutes that is the upper limit time.

The control unit 107 generates information of a list of the scenes designated by the playlist, and stores the resultant in the memory 106 (S1101). Then, the control unit 107 detects the positions of the frame at the head and the frame at the end of all scenes designated by the playlist, and stores the resultant in the memory 106 (S1102). The control unit 107 sets the conversion remaining time to ten minutes (S1103), designates the top scene of the scenes designated by the playlist as the conversion subject scene (S1104), and sets the frame at the head of the conversion subject scene as the conversion start point (S1105).

The control unit 107 determines whether the reproduction time from the conversion start point to the end of the conversion subject scene is equal to or more than the conversion remaining time (S1106). If it is equal to or more than the conversion remaining time (S1106), the control unit 107 sets the frame after the conversion start point by the conversion remaining time as the conversion end point (S1107). If the time from the conversion start point to the end of the scene is less than the conversion remaining time (S1106), the control unit 107 sets the frame of the end of the scene as the conversion end point (S1120).

Then, the control unit 107 reproduces the moving image file of the scene selected from the recording medium 110 by the recording reproducing unit 109, and executes the conversion process to the frame at the conversion start point so as to reduce the conversion remaining time by one frame (S1109).

After the conversion process is started, the control unit 107 determines whether a stop instruction is issued from a user (S1110). If the stop instruction is not issued (S1110), the control unit 107 converts the next frame (S1111), and reduces the conversion remaining time by one frame (S1112). Thereafter, the control unit determines whether it reaches the conversion end point (S1113). When it does not reach the conversion end point (S1113), the control unit 107 returns to step S1110 to continue the processing.

When it reaches the conversion end point (S1113), the control unit 107 determines whether there is a conversion remaining time (S1114). If there is no conversion remaining time (zero) (S1114), the control unit 107 temporarily closes the converted moving image file, and stops the conversion process (S1115). Thereafter, the control unit 107 determines whether it reaches the end of the scene (S1116). When it does not reach the end of the scene (S1116), the control unit 107 sets the next frame as the conversion start point (S1121), sets the conversion remaining time to ten minutes (S1122), and then, returns to step S1106. After that, the moving image signal newly converted is recorded as the new moving image file.

When it reaches the end of the scene (S1116), the control unit 107 determines where there is a scene that should next be converted (S1117). If there is a next scene (S1117), the control unit 107 designates the next scene as the conversion subject scene (S1123), and then, returns to step S1105. With the processes in steps S1117 to S1123, the moving images of the plural scenes designated by the playlist are combined.

If there is no next scene (S1117), or if the stop instruction is issued (S1110), the control unit 107 executes the adjustment process same as that in step S607 (S1118). Then, the control unit 107 records the moving image file after the adjustment process onto the recording medium 110, and ends the conversion process (S1119).

Figure 19A:
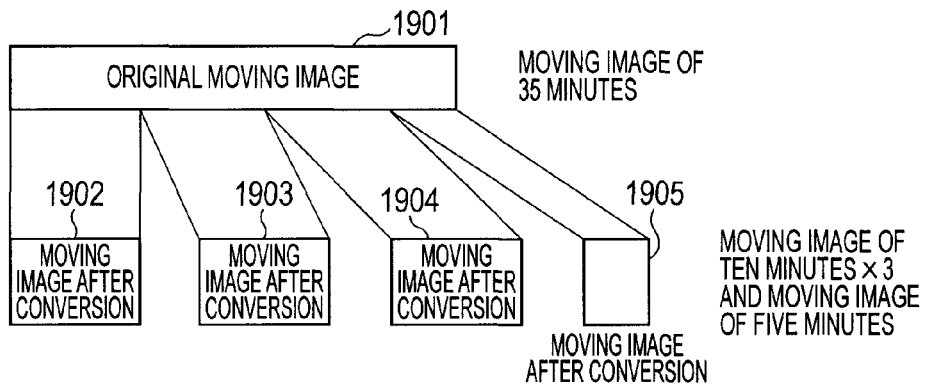
FIGS. 19A, 19B and 19C are views illustrating a moving image converted by the conversion process according to the first embodiment of the present invention.

FIG. 19A is a view illustrating an example of the moving image file generated by the processing 4. In FIG. 19A, a moving image file 1901 of one scene is selected as the conversion subject file. When the reproduction time of the file 1901 is 35 minutes, three moving image files 1902, 1903, and 1904 are generated by dividing the moving image file 1901 on a ten minutes basis and executing the conversion process. Further, a moving image file 1905 having the reproduction time of 5 minutes is generated.

Figure 19B:
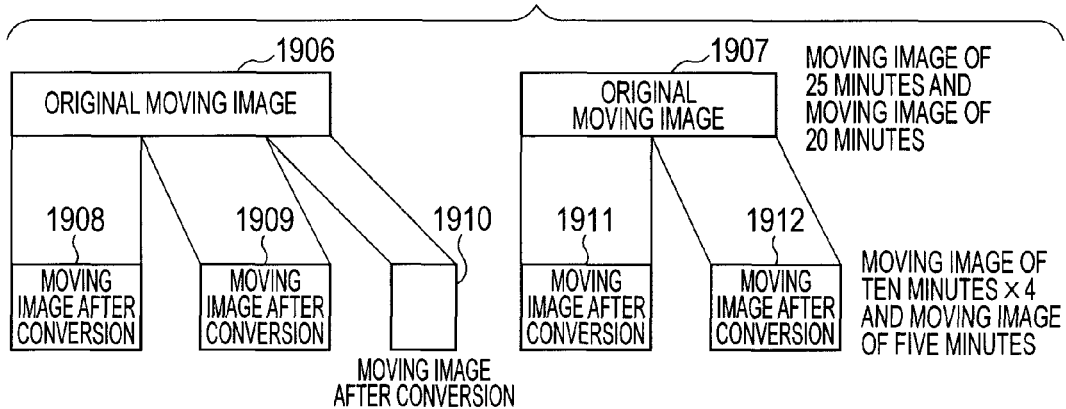

FIG. 19B is a view illustrating an example of a moving image file generated by the processing 5. In FIG. 19B, moving image files 1906 and 1907 of two scenes are selected as the conversion subject file. When the reproduction time of the file 1906 is 25 minutes, the moving image file 1906 is divided on a ten minutes basis and subject to the conversion process, whereby two moving image files 1908 and 1909 are generated. A moving image file 1910 having the reproduction time of 5 minutes is also generated. Further, when the reproduction time of the file 1907 is 20 minutes, the moving image file 1907 is divided on a ten minutes basis and subject to the conversion process, whereby two moving image files 1911 and 1912 are generated.

Figure 19C:
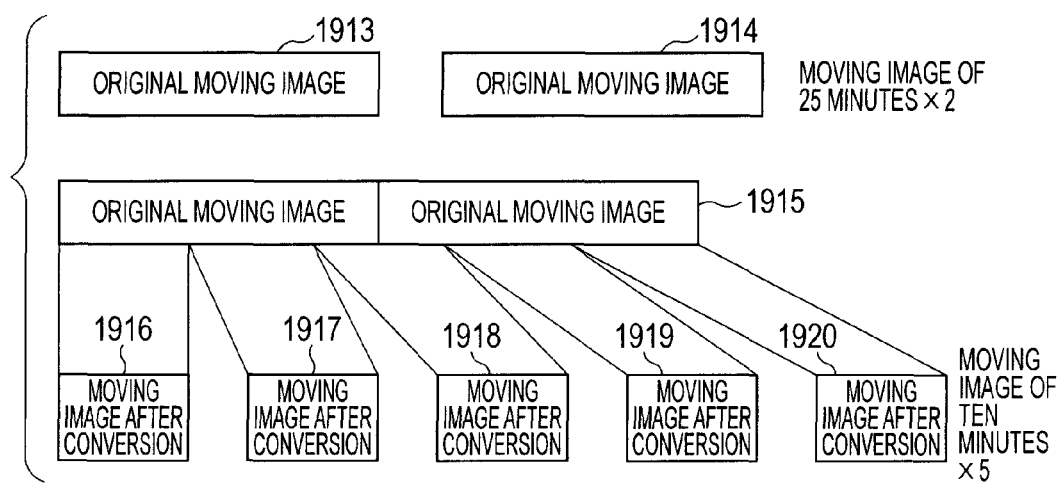

FIG. 19C is a view illustrating an example of a moving image file generated by the processing 6. In FIG. 19C, moving image files 1913 and 1914 of two scenes are designated by the playlist, and these two moving image files are selected as the conversion subject file. When the reproduction time of each of the files 1913 and 1914 is 25 minutes, a moving file 1915, which is formed by combining these files, is divided on a ten minutes basis and subjected to the conversion process, whereby five moving image files 1916, 1917, 1918, 1919, and 1920 are generated.

As described above, in the present embodiment, when the conversion process is instructed with the index screen being displayed, the moving image data is automatically converted into a predetermined format according to the storage destination after the conversion and the set reproduction mode.

Thus, a user can acquire the data in which the recorded moving image is converted into a format suitable for the storage destination with a simple operation. The user ejects the recording medium 110 on which the converted moving image file is recorded, from the video camera, and loads the same to a PC, whereby he/she can transmit or store the converted moving image file to a DVD or a server on a network.

The moving image file recorded on the recording medium 110 as being converted by the conversion process can be reproduced with the first mode. In this case, in the present embodiment, an index screen of moving image files recorded by the conversion process is generated, separately from the index screen of the moving image files recorded in a photographing mode. These two index screens are changed and displayed on the display unit 105 according to the instruction of the user. The user can select a desired moving image file of the converted and recorded moving image files from the index screen, and give an instruction to reproduce the file. The moving image signal recorded by the conversion process is encoded according to the MPEG2 method. Therefore, the signal processing unit 103 decodes the reproduced moving image signal according to the MPEG2 method.

In the present embodiment, the registration of the moving image file, which is recorded by the conversion process, to the playlist is inhibited. Therefore, the moving image file recorded by the conversion process is not reproduced in the second reproduction mode.

In the present embodiment, the conversion process cannot be executed to the moving image file recorded by the conversion process. Specifically, even if the converting instruction is issued when the index screen of the moving image files recorded by the conversion process is displayed, the screen in FIG. 4A is not displayed, but information indicating that the conversion cannot be executed is displayed.

Second Embodiment

A second embodiment will next be described. In this embodiment too, the configuration and the basic process of the video camera 100 are the same as those in the first embodiment. In the present embodiment, the conversion process can be instructed in a reproduction temporary stop state. FIG. 12 is a view illustrating the conversion process in the present embodiment.

As illustrated in FIG. 12, when the converting instruction is issued with the index screen being displayed, the conversion process is executed as stated in the first embodiment. When a user operates the operation unit 108 to temporarily stop the reproduction during the reproduction of the moving image in the first mode or the second mode, and then, the user issues the converting instruction, the conversion process is executed. For example, when the DVD is selected as the storage destination, the moving image and the audio from the position where the reproduction is temporarily stopped, to the end of the scene are converted into a format according to the format of the storage destination in each of the first reproduction mode and the second reproduction mode. On the other hand, when the Web is selected as the storage destination, the conversion process is different depending on the reproduction mode. When the Web is selected as the storage destination and the conversion instruction is issued when the reproduction is temporarily stopped in the first reproduction mode, the moving image and the audio from the position where the reproduction is temporarily stopped, to the upper limit time are converted into the format according to the format of the storage destination. In this case, when the time from the position where the reproduction is temporarily stopped, to the end of the scene is less than the upper limit time (ten minutes), the moving image and the audio from the position where the reproduction is temporarily stopped, to the end of the scene are converted into a format according to the format of the storage destination. When the Web is selected as the storage destination and the conversion instruction is issued when the reproduction is temporarily stopped in the second reproduction mode, all of the scenes are combined in the order designated by the playlist, and in the combined state, the moving image and the audio from the position where the reproduction is temporarily stopped, to the upper limit time are converted into a format according to the format of the storage destination. When the time from the position where the reproduction is temporarily stopped, to the end of the scene is less than ten minutes with all of the scenes being combined in the order designated by the playlist, the moving image and the audio from the position where the reproduction is temporarily stopped, to the end of the scene are converted into a format according to the format of the storage destination.

Figure 13A:
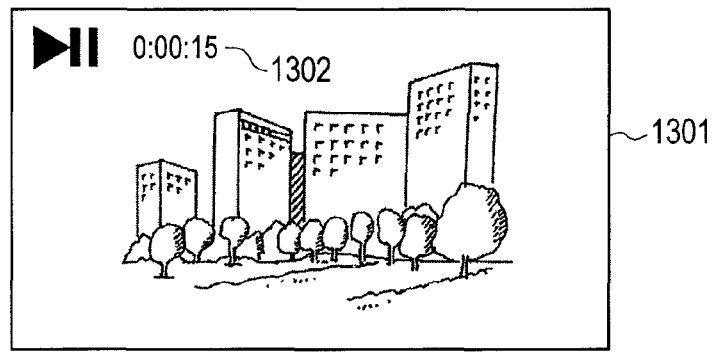
FIGS. 13A, 13B, 13C and 13D are views illustrating a display screen during the conversion process according to the second embodiment of the present invention.
Figure 13B:
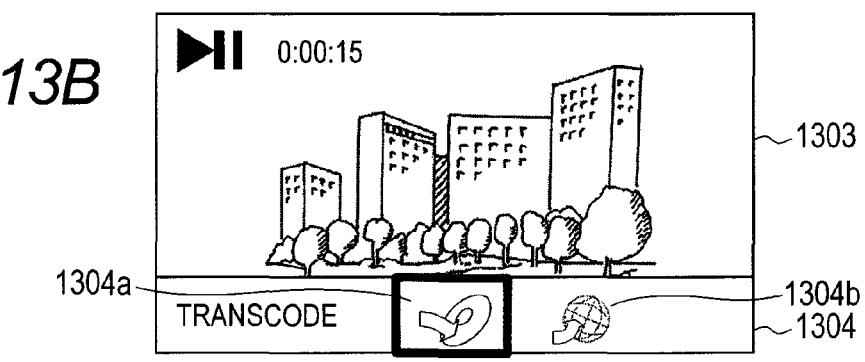
Figure 13C:
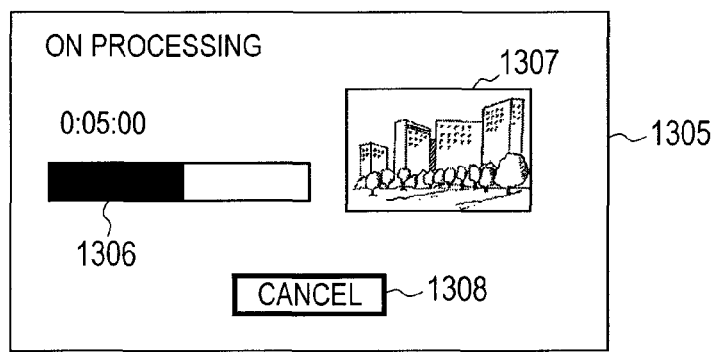

FIGS. 13A, 13B, 13C and 13D are views illustrating a display screen displayed on the display unit 105 when the converting instruction is issued in the reproduction temporary stop state. A display screen 1301 in FIG. 13A indicates the reproduction temporary stop state, wherein information 1302 indicating the elapsed time from the head of the reproduced scene is displayed on the display unit 105. When the user gives an instruction of the conversion process in this state, a storage-destination selecting screen 1303 in FIG. 13B is displayed on the display unit 105. Information 1304 for selecting the storage destination after the conversion is displayed on the display unit 105 in the screen 1303. In the information 1304, an icon 1304a represents a DVD, while an icon 1304b represents Web.

When the user operates the operation unit 108 to select either one of the storage destinations, the conversion process is started, and a screen 1305 (FIG. 13C) indicating that the conversion process is being executed is displayed on the display unit 105 instead of the screen 1303. A progress bar 1306 indicating the progression state of the conversion process is displayed on the screen 1305. A moving image 1307 that is being converted is also displayed. When the user selects a cancel button 1308, the user can give an instruction of stopping the conversion process.

Figure 13D:
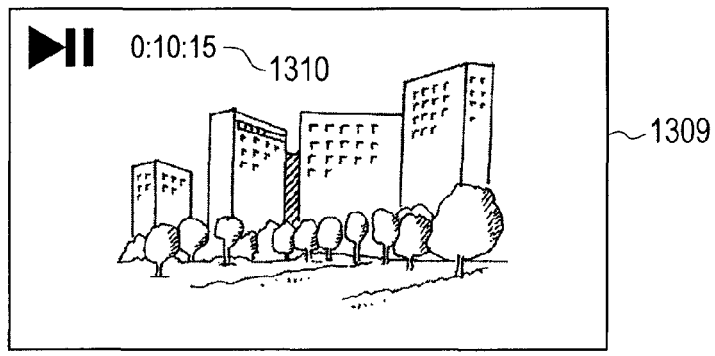

FIG. 13D illustrates a display screen 1309 when the conversion process is completed. Information 1310 indicating the elapsed time is displayed thereon.

Figure 14B:
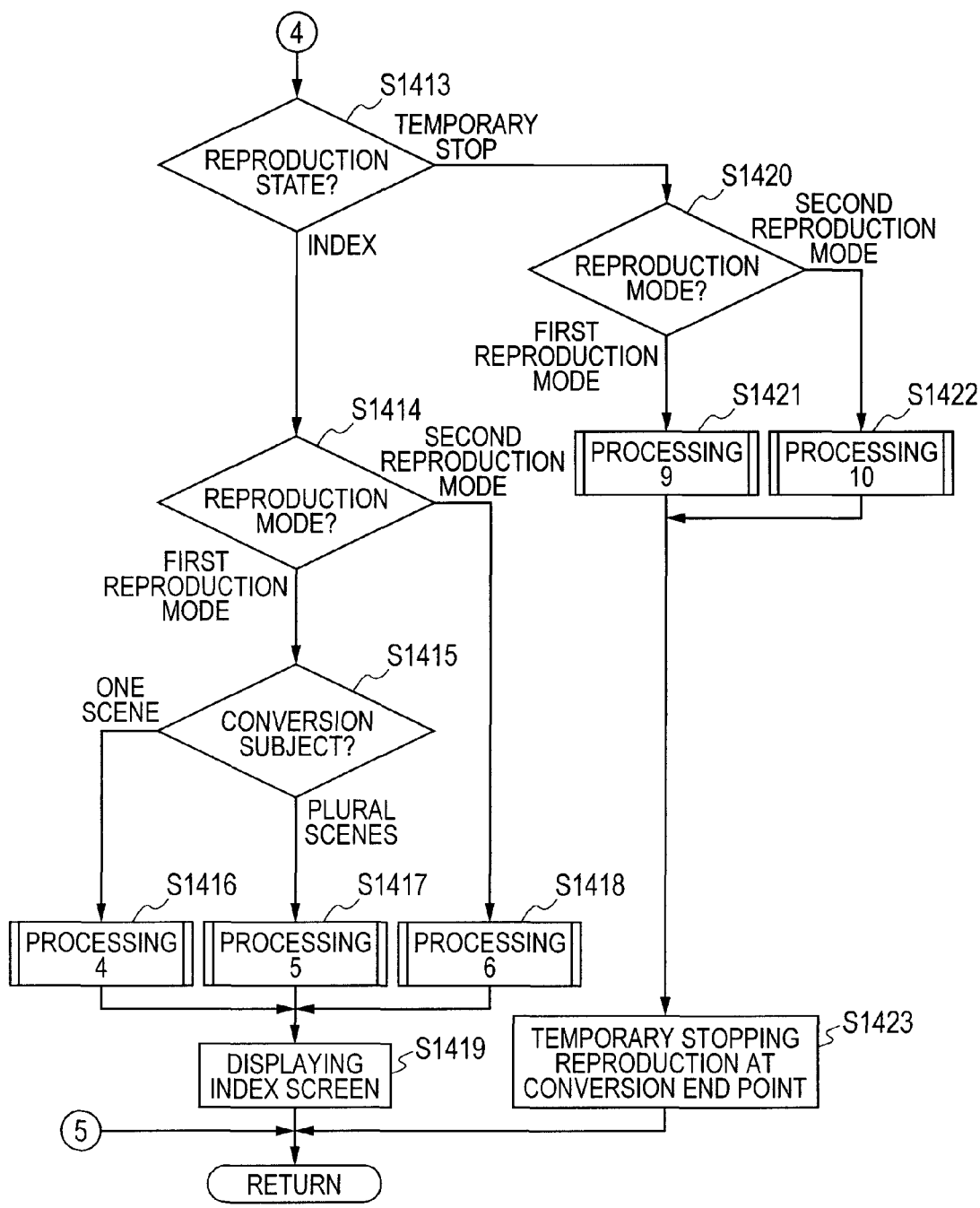
FIG. 14 is comprised of FIGS. 14A and 14B showing flowcharts illustrating the conversion process according to the second embodiment of the present invention.

FIGS. 14A and 14B is a flowchart illustrating the conversion process in the second embodiment. The conversion process described here is executed through the control of the respective units by the control unit 107. In FIGS. 14A and 14B, the processes in steps S1403 to S1407 and the processes in steps S1414 to S1418 are the same as those in steps S502 to S511 in FIG. 5. Therefore, the description will not be repeated. The processes in steps S1408 and S1419 are the same as those in step S512 in FIG. 5, so that the description will not be repeated.

The control unit 107 firstly determines which one of the DVD and the Web is selected as the storage destination (S1401). If the DVD is selected (S1401), the control unit 107 further determines whether the current reproduction state is the display state of the index screen or the reproduction temporary stop state (S1402). When it is the display state of the index screen (S1402), the control unit 107 proceeds to step S1403. The processes in steps S1403 to S1408 are the same as those in steps S502 to S512 in FIG. 5, so that the description will not be repeated.

When the current reproduction state is the reproduction temporary stop state (S1402), the control unit 107 determines which one of the first reproduction mode and the second reproduction mode is selected as the current reproduction mode (S1409). When the first reproduction mode is set (S1409), the control unit 107 executes processing 7 for converting the moving image and the audio from the position where the reproduction is temporarily stopped, to the end of the current scene (S1410). When the second reproduction mode is set (S1409), the control unit 107 executes processing 8 for converting all of the moving images and audio up to the end of the last scene designated by the playlist (S1411).

If the Web is selected as the storage destination (S1401), the control unit 107 determines whether the current reproduction state is the display state of the index screen or the reproduction temporary stop state (S1412). When it is the display state of the index screen (S1412), the control unit 107 proceeds to step S1413. The processes in steps S1413 to S1418 are the same as those in steps S502 to S512 in FIG. 5, so that the description will not be repeated.

When the current reproduction state is the reproduction temporary stop state (S1412), the control unit 107 determines which one of the first reproduction mode and the second reproduction mode is selected as the current reproduction mode (S1419). When the first reproduction mode is set (S1419), the control unit 107 executes processing 9 for converting the moving image and the audio from the position where the reproduction is temporarily stopped, to the earlier one of the position ten minutes after the above-mentioned position and the end of the current scene (S1420). When the second reproduction mode is set (S1419), the control unit 107 executes processing 10 for converting the moving image and audio from the position where the reproduction is temporarily stopped, to the earlier one of the position ten minutes after the above-mentioned position and the end of the last scene designated by the playlist (S1421).

Figure 15:
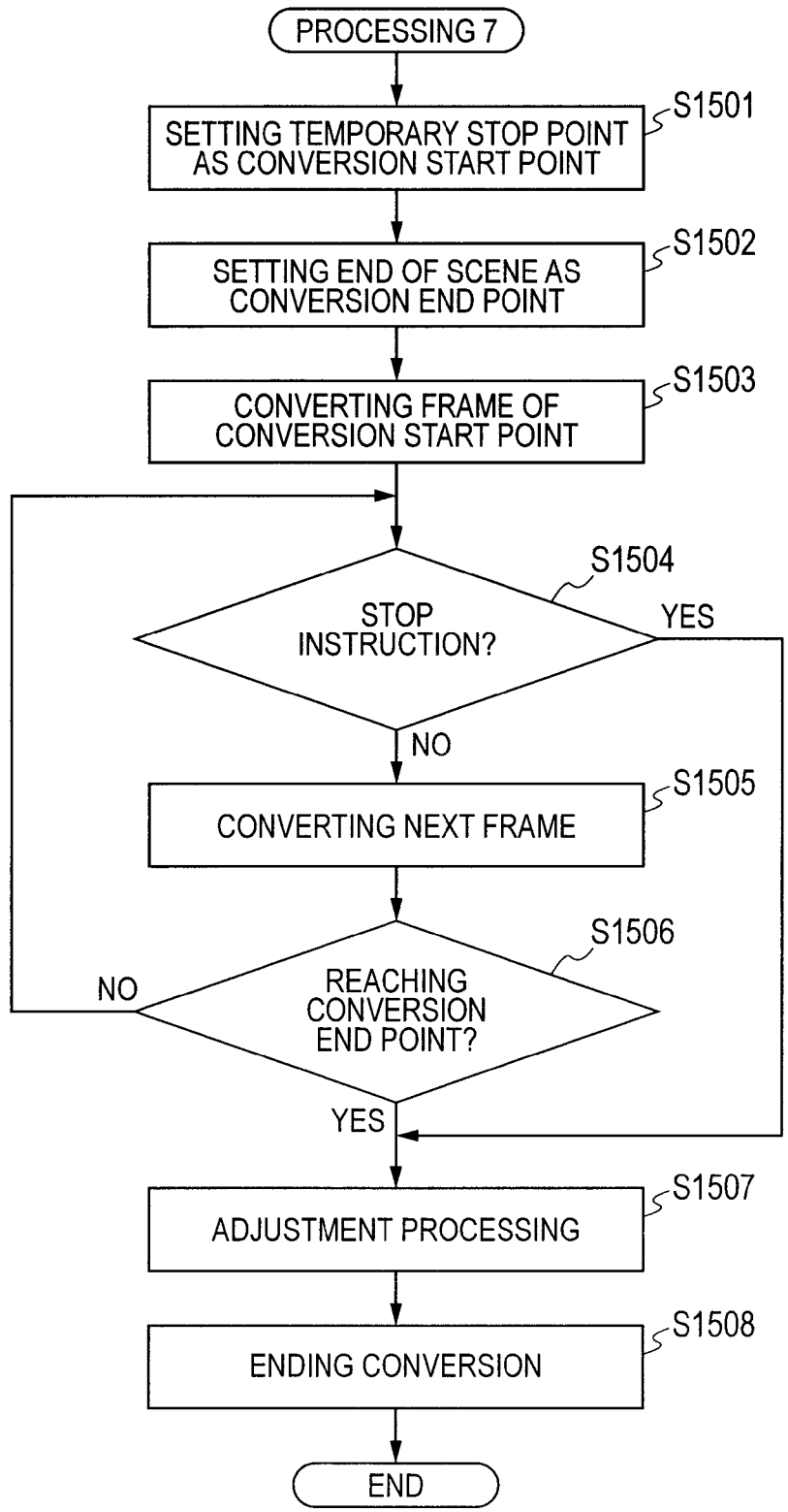
FIG. 15 is a flowchart illustrating the conversion process according to the second embodiment of the present invention.

FIG. 15 is a flowchart illustrating the processing 7. The processing 7 is the one for converting the moving image and audio from the position where the reproduction is temporarily stopped to the end of the scene that is being reproduced.

The control unit 107 firstly sets the frame at a reproduction temporary stop point as the conversion start point (S1501), and sets the last frame of the scene as the conversion end point (S1502). The control unit 107 starts the reproduction of the moving image signal from the reproduction temporary stop point by the recording reproducing unit 109 to execute the conversion process on one frame at the conversion start point (S1503).

After the start of the conversion process, the control unit 107 determines whether the instruction of stopping the process is issued by a user (S1504). When the stop instruction is not issued (S1504), the control unit 107 converts the next frame (S1505), and determines whether it reaches the conversion end point (S1506). When it does not reach the conversion end point (S1506), the control unit 107 returns to step S1504 to continue the processing.

When it reaches the conversion end point (S1506), or when the stop instruction is issued (S1504), the control unit 107 executes the adjustment process same as that in step S607 (S1507). Then, the control unit 107 records the moving image file after the adjustment process onto the recording medium 110, and ends the conversion process (S1508).

Figure 16:
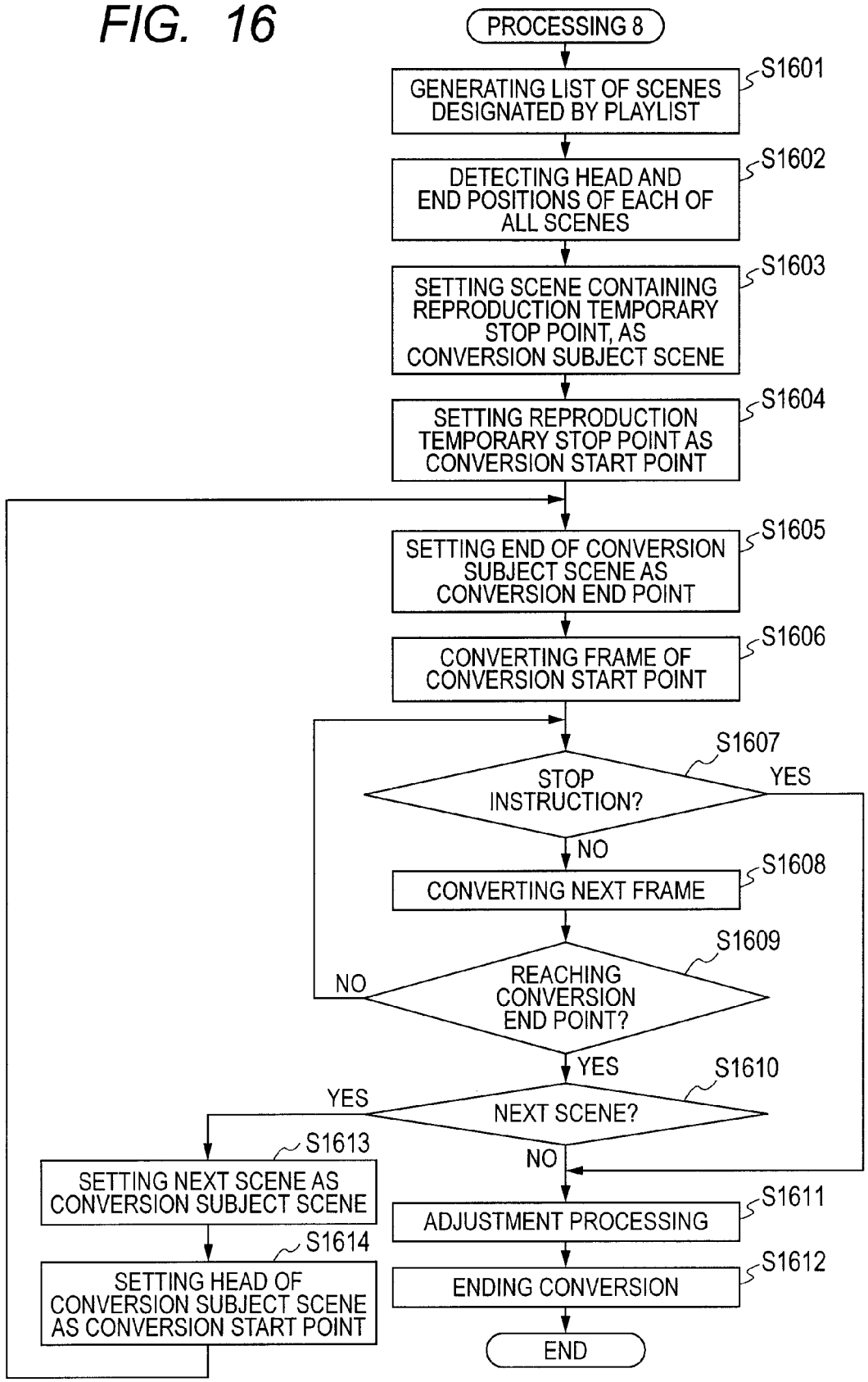
FIG. 16 is a flowchart illustrating the conversion process according to the second embodiment of the present invention.

FIG. 16 is a flowchart illustrating the processing 8. The processing 8 is the one for combining and converting moving images and audio after the position where the reproduction is temporarily stopped, in plural scenes designated by the playlist.

The control unit 107 firstly generates information of a list of the scenes designated by the playlist, and stores the resultant in the memory 106 (S1601). Then, the control unit 107 detects the head and end positions of all scenes designated by the playlist (S1602).

The control unit 107 sets the scenes containing the reproduction temporary stop position as the conversion subject scene (S1603). Then, the control unit 107 sets the frame at the reproduction temporary stop position as the conversion start point (S1604), and sets the last frame of the conversion subject scene as the conversion end point (S1605). The control unit 107 reproduces the moving image file of the conversion subject scene from the reproduction temporary stop position, and executes the conversion process on the frame at the conversion start point (S1606).

After the start of the conversion process, the control unit 107 determines whether the instruction of stopping the process is issued by a user (S1607). If the stop instruction is not issued (S1607), the control unit 107 converts the next frame (S1608), and determines whether it reaches the conversion end point (S1609). When it does not reach the conversion end point (S1609), the control unit 107 returns to step S1607 to continue the processing.

When it reaches the conversion end point (S1609), the control unit 107 determines whether there is a next scene, on the basis of the information of the list of the scenes designated by the playlist (S1610). If there is a next scene (S1610), the control unit 107 sets the next scene as the conversion subject scene (S1613), sets the top frame of the conversion subject scene as the conversion start point (S1614), and then, returns to step S1605.

If there is a stop instruction is issued (S1607), or when there is no next scene (S1610), the control unit 107 executes the adjustment process as in step S607 (S1611). Then, the control unit 107 records the moving image file after the adjustment process onto the recording medium 110, and ends the conversion process (S1612).

Figure 17:
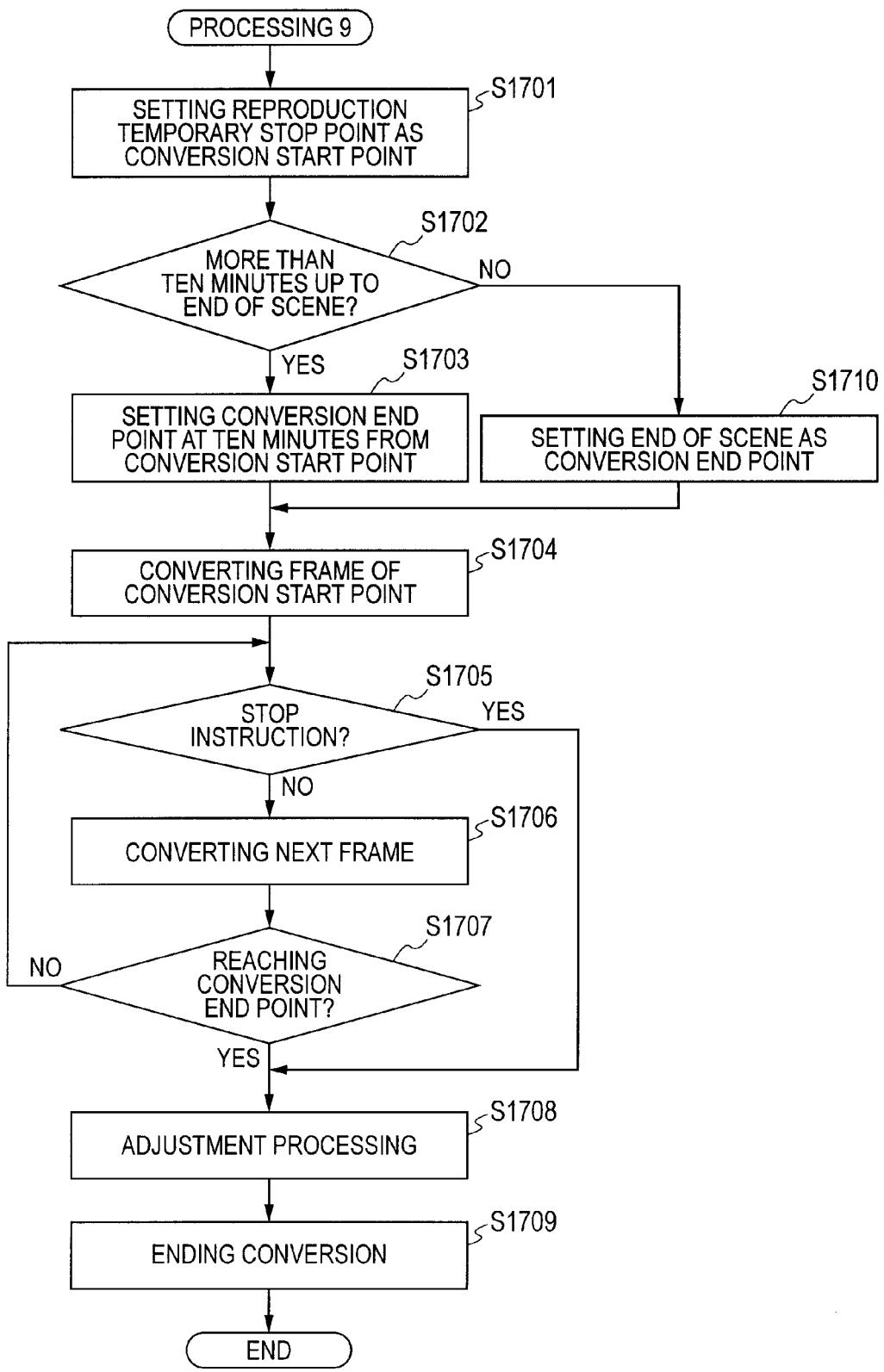
FIG. 17 is a flowchart illustrating the conversion process according to the second embodiment of the present invention.

FIG. 17 is a flowchart illustrating the processing 9. The processing 9 is the one for converting the moving image and audio from the position where the reproduction is temporarily stopped, to the earlier one of the position ten minutes after the above-mentioned position and the end of the scene.

The control unit 107 sets the frame at the reproduction temporary stop point as the conversion start point (S1701), and determines whether the reproduction time from the conversion start point to the end of the scene is more than ten minutes (S1702). When it is more than ten minutes (S1702), the control unit 107 sets the frame ten minutes from the conversion start point as the conversion end point (S1703). When the time from the conversion start point to the end of the scene is less than ten minutes, the control unit 107 sets the last frame of the scene as the conversion end point (S1710). The control unit 107 reproduces the moving image file from the reproduction temporary stop point by the recording reproducing unit 109, and executes the conversion process to the frame at the conversion start point (S1704).

After the start of the conversion process, the control unit 107 determines whether the instruction of stopping the process is issued by a user (S1705). If the stop instruction is not issued (S1705), the control unit 107 converts the next frame (S1706), and determines whether it reaches the conversion end point (S1707). When it does not reach the conversion end point (S1707), the control unit 107 returns to step S1705 to continue the processing.

When it reaches the conversion end point (S1707), or when the stop instruction is issued (S1705), the control unit 107 executes the adjustment process same as that in step S607 (S1708). Then, the control unit 107 records the moving image file after the adjustment process onto the recording medium 110, and ends the conversion process (S1709).

Figures 18, 18A:
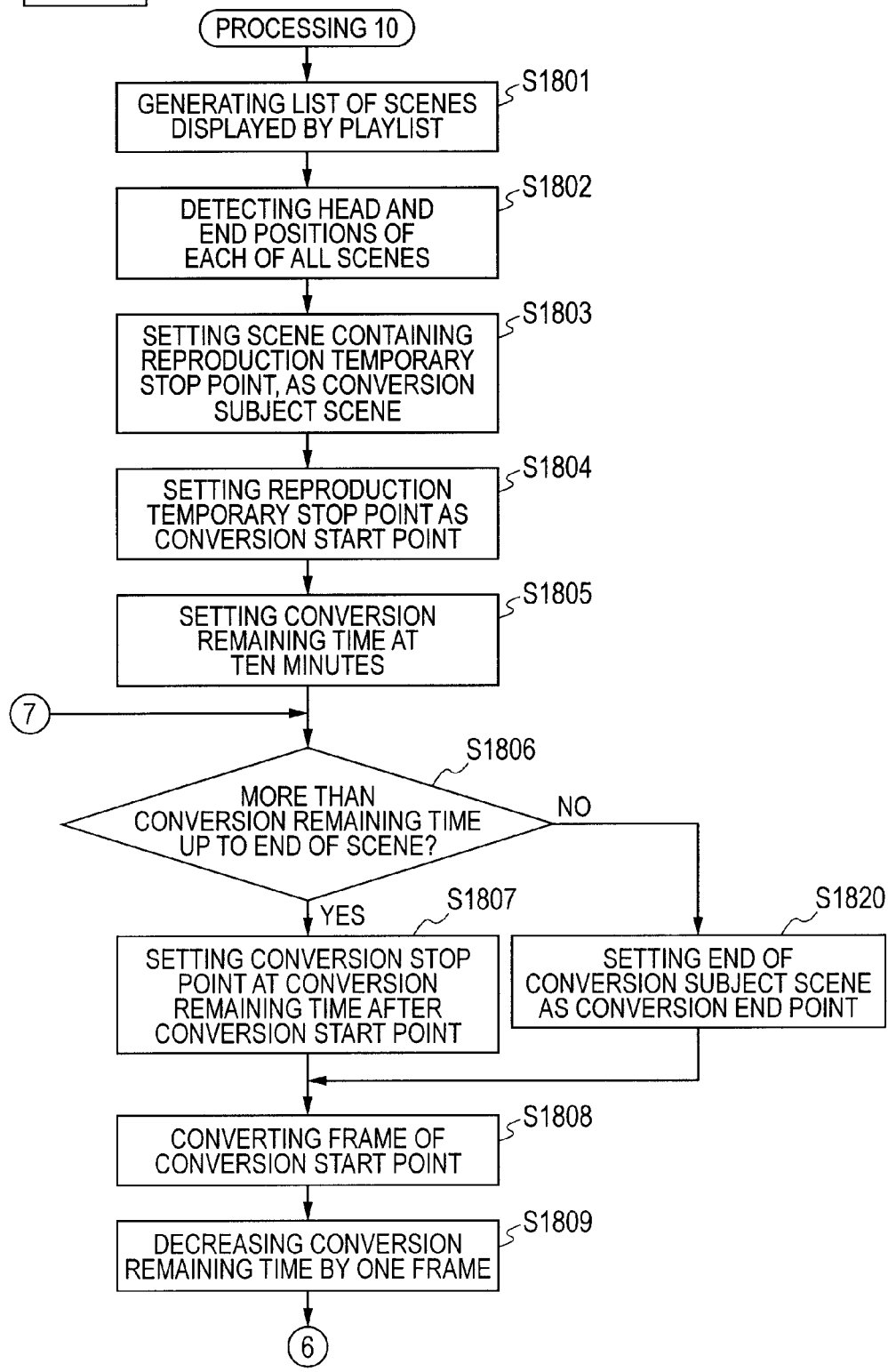
FIG. 18 is comprised of FIGS. 18A and 18B showing flowcharts illustrating the conversion process according to the second embodiment of the present invention.
Figure 18B:
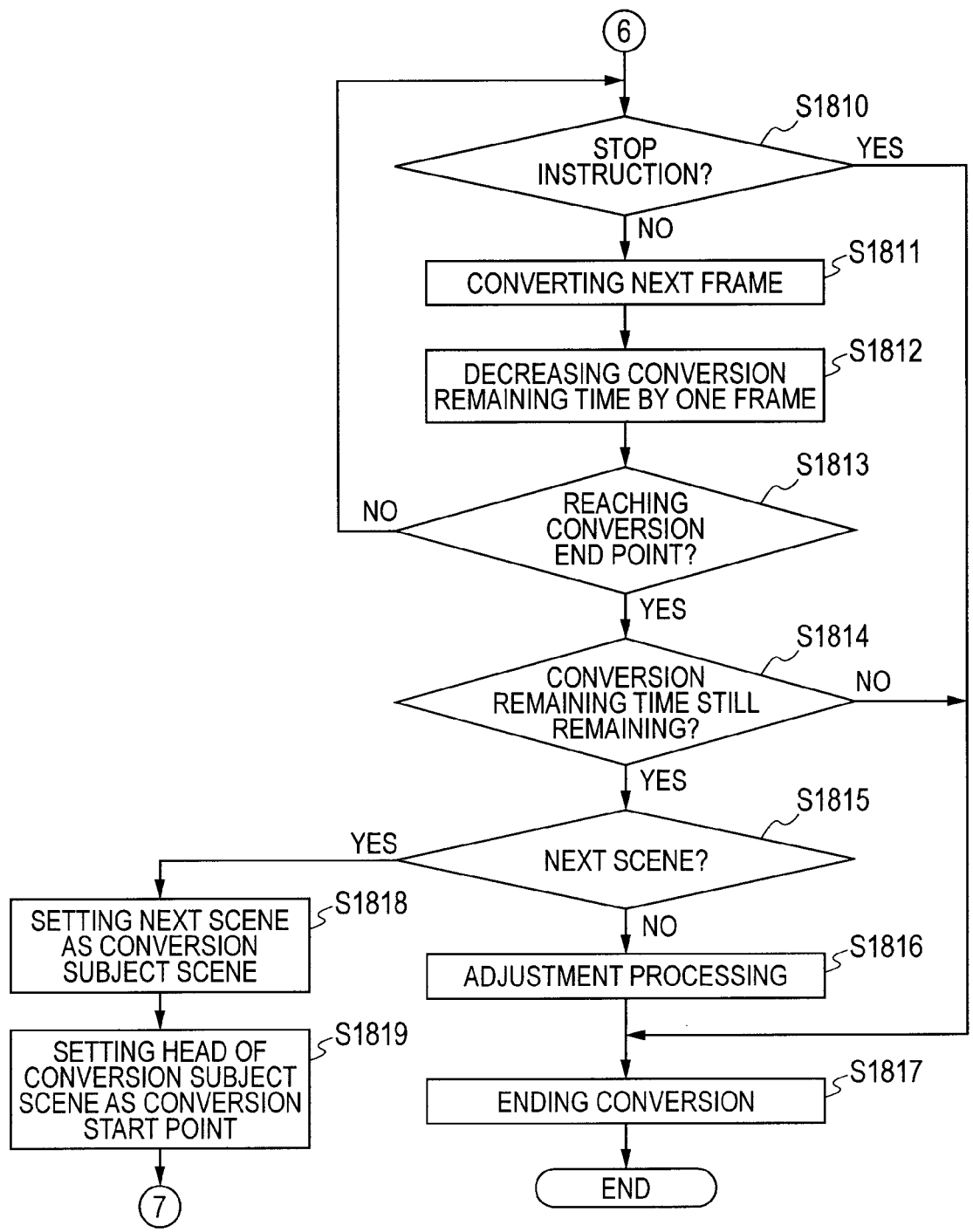

FIGS. 18A and 18B are flowcharts illustrating the processing 10. The processing 10 is the one in which the moving image files of the plural scenes designated by the playlist are combined, and the moving image and audio from the position where the reproduction is temporarily stopped, to the earlier one of the position ten minutes after the above-mentioned position and the end of the scene are converted.

The control unit 107 generates information of a list of the scenes designated by the playlist, and stores the resultant in the memory 106 (S1801). The control unit 107 detects the positions of the frame at the head and the frame at the end of all scenes designated by the playlist, and stores the resultant in the memory 106 (S1802). The control unit 107 sets the scene including the reproduction temporary stop point as the conversion subject scene (S1803), sets the reproduction temporary stop point as the conversion start point (S1804), and sets the conversion remaining time to ten minutes (S1805).

The control unit 107 determines whether the reproduction time from the conversion start point to the end of the conversion subject scene is equal to or more than the conversion remaining time (S1806). If it is equal to or more than the conversion remaining time (S1806), the control unit 107 sets the frame after the conversion start point by the conversion remaining time as the conversion end point (S1807). If the time from the conversion start point to the end of the scene is less than the conversion remaining time, the control unit 107 sets the last frame of the scene as the conversion end point (S1820). The control unit 107 reproduces the moving image file by the recording reproducing unit 109, and executes the conversion process to the frame at the conversion start point to reduce the conversion remaining time by one frame (S1809).

After the start of the conversion process, the control unit 107 determines whether the instruction of stopping the process is issued by a user (S1810). When the stop instruction is not issued (S1810), the control unit 107 converts the next frame (S1811) to reduce the conversion remaining time by one frame (S1812), and determines whether it reaches the conversion end point (S1813). When it does not reach the conversion end point (S1813), the control unit 107 returns to step S1810 to continue the processing.

When it reaches the conversion end point (S1813), the control unit 107 determines whether there is a conversion remaining time (S1814). If there is no conversion remaining time (zero) (S1814), the control unit 107 temporarily closes the converted moving image file, and ends the conversion process (S1817).

If there is the conversion remaining time left (S1814), the control unit 107 determines whether there is the next scene that should be converted (S1815). If there is a next scene (S1815), the control unit 107 designates the next scene as the subject conversion scene (S1818), sets the top frame of the conversion subject scene as the conversion start point (S1819), and then, returns to step S1806. With the processes in steps S1815, S1818, and S1819, the moving images of the plural scenes designated by the playlist are combined. If there is no next scene (S1815), the control unit 107 performs the adjustment process as in step S607 (S1816). Then, the control unit 107 records the moving image file after the adjustment process, and ends the conversion process (S1817).

Figure 20A:
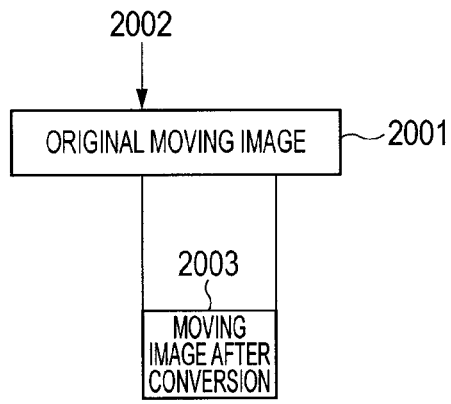
FIGS. 20A, 20B and 20C are views illustrating a moving image converted by the conversion process according to the second embodiment of the present invention.
Figure 20B:
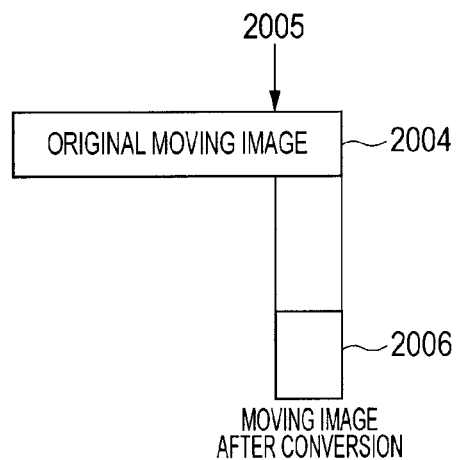

FIGS. 20A and 20B are views each illustrating an example of a moving image file generated by the processing 9. In FIG. 20A, a moving image file 2001 is the original moving image file that is to be subjected to the conversion subject. When an instruction of the conversion is issued with the reproduction being temporarily stopped at a position 2002, the moving image and audio from the position 2002 to the position ten minutes after the position 2002 are converted according to the format of the storage destination, whereby a moving image file 2003 after the conversion is generated.

In FIG. 20B, a moving image file 2004 is the original moving image file that is to be subjected to the conversion subject. The time from the position 2002 to the end of the moving image 2004 is less than ten minutes. Therefore, when an instruction of the conversion is issued with the reproduction being temporarily stopped at a position 2005, the moving image and audio from the position 2005 to the end are converted, whereby a moving image file 2006 after the conversion is generated.

Figure 20C:
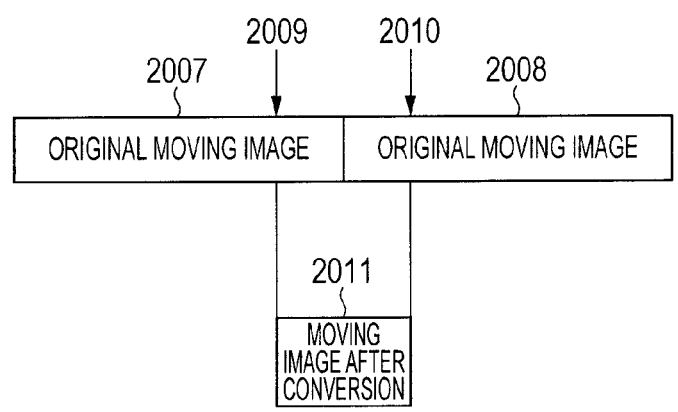

FIG. 20C is a view illustrating an example of a moving image file generated by the processing 11. In FIG. 20C, moving image files 2007 and 2008 are the original moving image files designated by the playlist. When the instruction of the conversion is issued with the reproduction being temporarily stopped at a position 2009, the moving images 2007 and 2008 are combined, and the moving image and audio from the position 2009 to the position 2010 ten minutes after the position 2009 are converted to generate a moving image file 2011 after the conversion. As described above, in the present embodiment, when the user gives the instruction of the conversion with the reproduction being temporarily stopped, the moving image and audio from the reproduction temporary stop position can be converted according to the format of the storage destination.

In the first and second embodiments, the moving image file after the conversion is recorded onto the same recording medium on which the original moving image file before the conversion is recorded. However, the moving image file after the conversion may be recorded on another recording medium.

Alternatively, a circuit that performs communication with the external network may be provided to the video camera 100, and the file after the conversion may be uploaded to a moving image sharing service through the network.

In the first and second embodiments, the present invention is applied to a video camera. However, the present invention is similarly applicable to an apparatus that reproduces a recorded moving image and executes a process of converting the image according to the format of the storage destination.

Although the number of pixels of one frame of the recorded moving image and an encoding format are both changed in the above-mentioned embodiments, they may not be converted, if they are the same as those specified by the storage destination. In the embodiments described above, the moving image is divided on a ten minutes basis and subjected to the conversion, when the Web is selected as the storage destination. However, the upper limit time may be changed according to the storage destination.

For example, the format specified by the plural moving image sharing services may be stored in the video camera 100, and the upper limit time may be set according to the storage destination designated by the user from the plural moving image sharing services. The moving image may be divided and converted according to the set upper limit time.

The process in the above-mentioned embodiments may be realized by providing a storage medium, on which a program code of software realizing the respective functions are recorded, to a system or an apparatus. When the system or a computer (or CPU or MPU) of the apparatus reads and executes the program code stored in the storage medium, the function of the above-mentioned embodiments can be realized. In this case, the program code itself read from the storage medium realizes the function of the above-mentioned embodiments, so that the storage medium storing the program code constitutes the present invention. Examples of usable storage medium storing the program code include a floppy (registered trademark) disk, a hard disk, an optical disk, and an optical magnetic disk. Further, a CD-ROM, a CD-R, a magnetic tape, a non-volatile memory card, and a ROM can be used.

The function of the embodiments described above cannot only be realized by executing the program code read by the computer. The present invention includes a case in which an OS (operating system) operated on the computer executes some or all of the actual processes based on the instruction from the program code, and the function of the embodiments described above is realized by this process.

The program code read from the storage medium may be written in a memory provided on an expansion board inserted into the computer or an expansion unit connected to the computer. The present invention includes a case in which a CPU provided on the expansion board or the expansion unit then performs some or all of the actual processes based on the instruction from the program code, and the function of the embodiments described above may be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-281622, filed Dec. 11, 2009, which is hereby incorporated by reference herein in its entirety.

What is claimed is:
1. A reproducing apparatus comprising:
a reproduction unit configured to reproduce a moving image signal from a recording medium on which moving image signals of a plurality of scenes are recorded;
a setting unit configured to set one of a first reproduction mode in which the reproduction unit reproduces one scene selected from the moving image signals of the plurality of scenes and a second reproduction mode in which the reproduction unit reproduces the moving image signals according to a playlist that designates the reproducing order of the moving image signals of the plurality of scenes;
a conversion unit configured to convert the moving image signal recorded on the recording medium into a format designated by a transmission destination of the moving image signal, and to generate a converted moving image signal; and
a control unit configured to control the conversion unit in response to a conversion instruction such that, in the first reproduction mode, the moving image signal of the one scene is divided on a unit basis of predetermined time which is time related to an upper limit time designated by the transmission destination of the moving image signal, and in the second reproduction mode, the moving image signals of the plurality of scenes are combined and the combined moving image signal is divided on the predetermined time basis.

2. The apparatus according to claim 1, further comprising a recording unit configured to record the moving image signal generated by the conversion unit onto the recording medium.

3. The apparatus according to claim 1, wherein the conversion unit converts an encoding format of the moving image signal recorded on the recording medium into an encoding format designated by the transmission destination.

4. The apparatus according to claim 1, wherein the conversion unit converts the number of pixels of one frame of the moving image signal recorded on the recording medium into a number of pixels designated by the transmission destination.

5. The apparatus according to claim 1, wherein the control unit controls the conversion unit in response to the conversion instruction in the first reproduction mode such that the portion from the head to the end of the moving image signal of the one scene is divided on the predetermined time basis.

6. The apparatus according to claim 1, wherein the control unit controls the conversion unit in response to the conversion instruction in the second reproduction mode such that the moving image signals of all scenes designated by the playlist are combined and the portion from the head to the end of the combined moving image signal is divided on the predetermined time basis.

7. The apparatus according to claim 1, wherein the control unit controls the conversion unit in response to the conversion instruction in the first reproduction mode such that the portion from the designated position to the end of the moving image signal of the one scene is divided on the predetermined time basis.

8. The apparatus according to claim 1, wherein the control unit controls the conversion unit in response to the conversion instruction in the second reproduction mode such that the portion from the scene including the designated position to the last scene in the moving image signals of all scenes designated by the playlist are combined and the portion from the designated position to the end of the combined moving image signal is divided on the predetermined time basis.

9. A reproducing method comprising:
reproducing a moving image signal from a recording medium on which the moving image signals of a plurality of scenes are recorded;
setting one of a first reproduction mode in which the reproducing step reproduces one scene selected from the moving image signals of the plurality of scenes and a second reproduction mode in which the reproducing step reproduces the moving image signals according to a playlist, which designates the reproducing order of the moving image signals of the plurality of scenes;
converting the moving image signal recorded on the recording medium into a format designated by a transmission destination of the moving image signal, to generate a converted moving image signal; and
controlling the conversion step in response to a conversion instruction such that, in the first reproduction mode, the moving image signal of the one scene is divided on a unit basis of predetermined time related to an upper limit time designated by the transmission destination of the moving image signal, and in the second reproduction mode, the moving image signals of the plurality of scenes are combined, and the combined moving image signal is divided on the predetermined time basis.

10. A non-transitory computer-readable storage medium storing a computer program comprising a program code for causing a computer to execute the reproducing method according to claim 9.

11. A reproducing apparatus comprising:
a reproduction unit configured to reproduce a moving image signal from a recording medium on which moving image signals of a plurality of scenes are recorded;
a setting unit configured to set one of a plurality of reproduction modes including a first reproduction mode in which the reproduction unit reproduces one scene selected from the moving image signals of the plurality of scenes and a second reproduction mode in which the reproduction unit reproduces the moving image signals according to a playlist that designates the reproducing order of the moving image signals of the plurality of scenes;
a processing unit configured to generate, from the moving image signal recorded on the recording medium, a moving image signal of a predetermined format corresponding to a transmission destination of the moving image signal;
a control unit configured to control the processing unit in accordance with the reproduction mode set by the setting unit,
wherein the control unit controls the processing unit in response to a conversion instruction, in the first reproduction mode, to generate the moving image signal of the predetermined format which includes the image signal of the one scene divided on a unit basis of predetermined time, and in the second reproduction mode, to generate the moving image signal of the predetermined format which includes the moving image signals of the plurality of scenes combined with each other and divided on the predetermined time basis.

12. The apparatus according to claim 11, further comprising a recording unit configured to record the moving image signal of the predetermined format generated by the processing unit onto the recording medium.

13. The apparatus according to claim 11, wherein the control unit controls the processing unit in response to the conversion instruction in the first reproduction mode such that the portion from the head to the end of the moving image signal of the one scene is divided on the predetermined time basis.

14. The apparatus according to claim 11, wherein the control unit controls the processing unit in response to the conversion instruction in the second reproduction mode such that the moving image signals of all scenes designated by the playlist are combined and the portion from the head to the end of the combined moving image signal is divided on the predetermined time basis.

15. The apparatus according to claim 11, wherein the control unit controls the processing unit in response to the conversion instruction in the first reproduction mode such that the portion from the designated position to the end of the moving image signal of the one scene is divided on the predetermined time basis.

16. The apparatus according to claim 11, wherein the control unit controls the processing unit in response to the conversion instruction in the second reproduction mode such that the portion from the scene including the designated position to the last scene in the moving image signals of all scenes designated by the playlist are combined and the portion from the designated position to the end of the combined moving image signal is divided on the predetermined time basis.

17. The apparatus according to claim 11, wherein the transmission destination includes a predetermined moving image sharing service.

\* \* \* \* \*